(12) United States Patent
Nakayama et al.

(10) Patent No.: US 11,275,356 B2
(45) Date of Patent: Mar. 15, 2022

(54) INPUT-OUTPUT CONTROL UNIT, PLC AND DATA CONTROL METHOD

(71) Applicant: Mitsubishi Electric Corporation, Tokyo (JP)

(72) Inventors: Takaya Nakayama, Tokyo (JP); Satoru Ukena, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/281,250

(22) PCT Filed: Nov. 22, 2018

(86) PCT No.: PCT/JP2018/043198
§ 371 (c)(1),
(2) Date: Mar. 30, 2021

(87) PCT Pub. No.: WO2020/105173
PCT Pub. Date: May 28, 2020

(65) Prior Publication Data
US 2021/0311459 A1 Oct. 7, 2021

(51) Int. Cl.
*G05B 19/418* (2006.01)

(52) U.S. Cl.
CPC .. *G05B 19/418* (2013.01); *G05B 2219/31001* (2013.01)

(58) Field of Classification Search
CPC ........ G05B 19/418; G05B 2219/31001; G01B 11/06; G01B 11/26; G01F 5/36; G06F 13/20
See application file for complete search history.

(56) References Cited

U.S. PATENT DOCUMENTS 5,845,149 A * 12/1998 Husted ................ G06F 12/0661
710/9
2005/0043824 A1* 2/2005 Wu ........................ G05B 19/05
700/18
(Continued)

FOREIGN PATENT DOCUMENTS

EP 3282332 A1 2/2018
JP 2017-138820 A 8/2017
(Continued)

OTHER PUBLICATIONS

International Search Report and Written Opinion dated Feb. 5, 2019, received for PCT Application PCT/JP2018/043198, Filed on Nov. 22, 2018, 6 pages including English Translation.
(Continued)

*Primary Examiner* — Kidest Bahta
(74) *Attorney, Agent, or Firm* — Xsensus LLP

(57) ABSTRACT

A data control apparatus includes an analog signal input interface for receiving an analog signal from a first device, a communication interface for receiving correlation information indicating addresses of storage areas in a storage and conditional values associated with the storage areas, and a data controller for writing a digital value generated from the analog signal into one of the storage areas. The data controller includes a cam switch block for acquiring a reference signal generated from an input signal input from a second device and comparing a value of the reference signal with at least one of the conditional values, and a logger block for switching the storage area into which the digital value is written, on the basis of the comparison in the cam switch block, and writing the digital value into the storage area.

10 Claims, 27 Drawing Sheets

(56) References Cited

U.S. PATENT DOCUMENTS

| | | |
|---|---|---|
| 2011/0307635 A1 | 12/2011 | Onishi et al. |
| 2013/0214954 A1 | 8/2013 | Onishi et al. |
| 2014/0075052 A1* | 3/2014 | Kris .................. G06F 15/7814 710/5 |
| 2015/0263748 A1 | 9/2015 | Ochiai |
| 2016/0026165 A1* | 1/2016 | Decker ................. G05B 11/01 700/9 |
| 2018/0329388 A1 | 11/2018 | Okuyama et al. |
| 2019/0179291 A1 | 6/2019 | Olsson |

FOREIGN PATENT DOCUMENTS

| | | |
|---|---|---|
| JP | 6173645 B1 | 8/2017 |
| TW | 1493301 B | 7/2015 |
| WO | 2010/109584 A1 | 9/2010 |
| WO | 2012/042556 A1 | 4/2012 |
| WO | 2014/064846 A1 | 5/2014 |
| WO | 2016/120906 A1 | 8/2016 |
| WO | 2016/121038 A1 | 8/2016 |
| WO | 2017/135247 A1 | 8/2017 |
| WO | 2018/030939 A1 | 2/2018 |

OTHER PUBLICATIONS

Notice of Reasons for Refusal dated Jul. 30, 2019, received for JP Application 2019-528776,4 pages including English Translation.
Decision to Grant dated Oct. 29, 2019, received for JP Application 2019-528776, 5 pages including English Translation.

* cited by examiner

| AREA SWITCHING TABLE | | |
|---|---|---|
| STEP NUMBER | CONDITIONAL VALUE | AREA NUMBER |
| 0 | 1000 | 251 |
| 1 | 2000 | 252 |
| 2 | 3000 | 253 |
| 3 | 4000 | 254 |
| 4 | 5000 | 255 |
| 5 | 6000 | 256 |
| 6 | 7000 | 257 |
| 7 | 8000 | 258 |
| 8 | 9000 | 259 |
| 9 | 10000 | 2510 |
| 10 | 11000 | 2511 |
| 11 | 12000 | 2512 |
| 12 | 13000 | 2513 |
| 13 | 14000 | 2514 |
| 14 | 15000 | 2515 |
| 15 | 16000 | 2516 |
| ⋮ | ⋮ | ⋮ |

FIG.8

AREA POINTER TABLE — 522

| AREA NUMBER | INITIAL ADDRESS | NUMBER OF DATA PIECES |
|---|---|---|
| 251 | 10000 | 10,000 |
| 252 | 30000 | 10,000 |
| 253 | 40000 | 5,000 |
| 254 | 50000 | 10,000 |
| 255 | 60000 | 10,000 |
| 256 | 70000 | 10,000 |
| 257 | 80000 | 10,000 |
| ⋮ | ⋮ | ⋮ |
| 25143 | 150000 | 20,000 |
| 25144 | 170000 | 10,000 |
| 25145 | 180000 | 20,000 |
| 25146 | 200000 | 20,000 |
| 25147 | 220000 | 20,000 |
| 25148 | 240000 | 20,000 |
| 25149 | 280000 | 10,000 |
| 25150 | 300000 | 10,000 |
| ⋮ | ⋮ | ⋮ |

| AREA POINTER TABLE | | | |
|---|---|---|---|
| AREA NUMBER | INITIAL ADDRESS | NUMBER OF DATA PIECES | REPETITION TIMES |
| 251 | 0 | 1,000 | 0 |
| 252 | 2,000 | 2,000 | 100 |
| 253 | 5,000 | 5,000 | 10 |
| 254 | 10,000 | 10,000 | 20 |
| 255 | 20,000 | 10,000 | 30 |
| 256 | 30,000 | 10,000 | 40 |
| 257 | 40,000 | 10,000 | 50 |
| ⋮ | ⋮ | ⋮ | ⋮ |
| 25143 | 150,000 | 20,000 | 1 |
| 25144 | 170,000 | 10,000 | 5 |
| 25145 | 180,000 | 20,000 | 10 |
| 25146 | 200,000 | 20,000 | 100 |
| 25147 | 220,000 | 20,000 | 1000 |
| 25148 | 240,000 | 20,000 | 300 |
| 25149 | 280,000 | 10,000 | 10 |
| 25150 | 300,000 | 10,000 | 0 |
| ⋮ | ⋮ | ⋮ | ⋮ |

| CORRELATION INFORMATION | | | | |
|---|---|---|---|---|
| STEP NUMBER | CONDITIONAL VALUE | AREA NUMBER | INITIAL ADDRESS | NUMBER OF DATA PIECES |
| 0 | 1000 | 251 | 1000 | 1000 |
| 1 | 2000 | 252 | 2000 | 3000 |
| 2 | 3000 | 253 | 5000 | 1000 |
| ⋮ | ⋮ | ⋮ | ⋮ | ⋮ |

| CORRELATION INFORMATION | | | | | | |
|---|---|---|---|---|---|---|
| STEP NUMBER | CONDITIONAL VALUE | AREA NUMBER | INITIAL ADDRESS | NUMBER OF DATA PIECES | DATA TYPE | REPETITION TIMES |
| 0 | 1000 | 251 | 1000 | 1000 | LOG | — |
| 1 | 2000 | 252 | 2000 | 3000 | WAVEFORM OUTPUT | 1000 |
| 2 | 3000 | 253 | 5000 | 1000 | LOG | — |
| ⋮ | ⋮ | ⋮ | ⋮ | ⋮ | ⋮ | ⋮ |

INPUT-OUTPUT CONTROL UNIT, PLC AND DATA CONTROL METHOD

CROSS-REFERENCE TO RELATED APPLICATION

The present application is based on PCT filing PCT/JP2018/043198, filed Nov. 22, 2018, the entire contents of which are incorporated herein by reference.

TECHNICAL FIELD

The present disclosure relates to an input-output control unit, a programmable logic controller (PLC), and a data control method.

BACKGROUND ART

In facilities such as factories, what has been required is to collect data output from sensors in the form of analog signal at a high frequency, for the purpose of preventive maintenance using the sensors and improvement of the inspection accuracy of the sensors. One of the conceivable techniques to satisfy this requirement is conversion of analog signals into digital signals and recording of these digital signals (for example, refer to Patent Literature 1). Patent Literature 1 discloses a technique in which an A/D conversion apparatus installed in a programmable logic controller (PLC) stores digital signals obtained through analog to digital (AD) conversion into an internal memory in the chronological order. In this technique, the A/D conversion apparatus does not transmit the digital signals to another apparatus. This configuration can therefore achieve rapid data collection in a period as short as the period of AD conversion.

CITATION LIST

Patent Literature

Patent Literature 1: International Publication No. WO 2010/109584

SUMMARY OF INVENTION

Technical Problem

As described above, rapid processing is required for the signals transmitted between a device, such as sensor, and an apparatus.

In specific, PLCs are expected to store a large amount of data in accordance with an increase in the speed of data collection. Although such a large amount of data is analyzed in upstream servers in most cases, the data should preferably be classified or subject to simple analysis in local facilities as much as possible. Specifically, the market demands the function of rapidly classifying data collected by a PLC, depending on the value of a signal other than the signal to be collected. Unfortunately, the technique disclosed in Patent Literature 1 was devised without consideration of the function of classifying collected data and storing the data into a memory. The classification of data thus must be achieved by an additional manual operation of checking the data collected by the PLC against another signal or by establishment of a program for reading the stored data again and classifying the data. Such complicated tasks should be eliminated to improve the convenience.

An objective of the disclosure, which has been accomplished in view of the above situations, is to improve the convenience of the process on signals transmitted between a device and a PLC.

Solution to Problem

In order to achieve the above objective, an input-output control unit according to an aspect of the disclosure is an input-output control unit constituting a programmable logic controller together with a central processing unit and for connection to a first device and a second device that are disposed on a line of a factory. The input-output control unit includes: a first input interface to receive a device signal from the first device; a communication interface to receive correlation information indicating addresses of storage areas included in a storage and conditional values associated with the storage areas; and a data controller to write a digital value generated from the device signal into one of the storage areas. The data controller includes a comparer to acquire a reference signal generated from an input signal input from the second device, and to compare a value of the reference signal with at least one of the conditional values; and a logger to switch the storage area into which the digital value is written, based on the comparison in the comparer, and to write the digital value into the storage area.

Advantageous Effects of Invention

According to an aspect of the disclosure, the first input interface receives a device signal from the first device. The comparer compares the value of the reference signal with at least one of the conditional values. The logger switches the storage area into which the digital value is written, based on the comparison in the comparer. This configuration can achieve selection of the storage area for storing digital values to be written depending on the value of the reference signal. The configuration can thus improve the convenience of the process on signals transmitted between the device and the PLC.

BRIEF DESCRIPTION OF DRAWINGS

FIG. 7 illustrates an area switching table according to Embodiment 1;

FIG. 8 illustrates an area pointer table according to Embodiment 1;

FIG. 18 illustrates an area pointer table according to Embodiment 5;

FIG. 27 is a first diagram illustrating correlation information according to a modification; and FIG. 28 is a second diagram illustrating correlation information according to a modification.

DESCRIPTION OF EMBODIMENTS

A PLC system 1000 according to embodiments of the disclosure is described in detail with reference to the accompanying drawings.

Embodiment 1

<Summary of the PLC system 1000>

Figure 1:
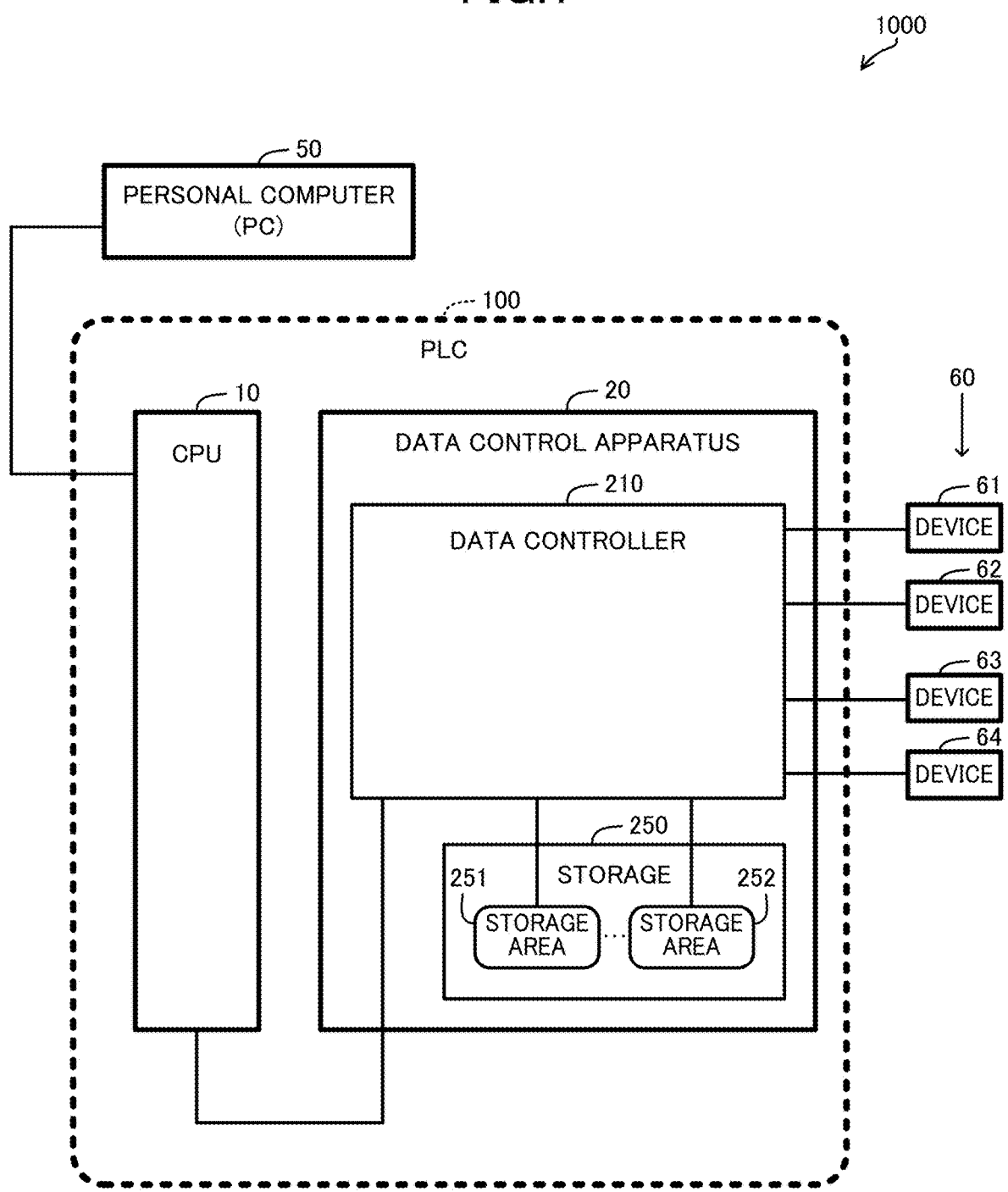
FIG. 1 illustrates a configuration of a PLC system according to Embodiment 1 of the disclosure.

The PLC system 1000 according to the embodiment is a control system corresponding to a part of an FA system installed in a factory. The PLC system 1000 is configured by connecting devices constituting the FA system to each other via communication paths. As illustrated in FIG. 1, the PLC system 1000 includes a programmable logic controller (PLC) 100 for controlling devices 61, 62, 63, and 64 disposed on a production line, and a personal computer 50 for setting the operations of the PLC 100. In the following description, the personal computer 50 is abbreviated as "PC 50".

The PLC 100 is connected to the devices 61 to 64. The device 61 is an external device represented by an encoder and outputs a digital signal. The digital signal from the device 61 is input to the PLC 100. The device 62 is an external device represented by a solenoid valve and receives the digital signal output from the PLC 100. The device 63 is an external device represented by a laser displacement sensor and outputs an analog signal. The analog signal from the device 63 is input to the PLC 100. The device 64 is an external device represented by a control valve and receives the analog signal output from the PLC 100. In the following description, the devices 61 to 64 are collectively referred to as "devices 60".

The devices 60 should not necessarily be the above-mentioned encoder, solenoid valve, laser displacement sensor, and control valve. The devices 60 may also be devices having at least one function selected from output of analog signals, input of analog signals, output of digital signals, and input of digital signals. For example, the device 61 or 63 may be a sensor for measuring a parameter, such as flow rate, pressure, or temperature, and outputting a current value or voltage value.

The PLC 100 executes the program set by a user at the PC 50 and controls the devices 60, and thereby runs the production line. The PLC 100 is equipped with a central processing unit (CPU) 10 that executes an arithmetic process and transmitting an instruction to a data control apparatus 20, and a data control apparatus 20 that operates in accordance with the instruction from the CPU 10.

The data control apparatus 20 includes a data controller 210 for controlling signals input from the devices 60 to the data control apparatus 20 and signals output from the data control apparatus 20 itself to the devices 60, and a storage 250 for storing data. The process of controlling signals input from the devices 60 executed in the data controller 210 involves logging the data on these signals into the storage 250. In detail, the data controller 210 acquires digital signals through AD conversion to the analog signals continuously input from the devices 60, and then sequentially writes the digital values contained in these digital signals into the storage 250. The data controller 210 then rapidly switches the write destination of digital values from either of a storage area 251 or 252 included in the storage 250 to the other storage area, depending on the situation.

Figure 2:
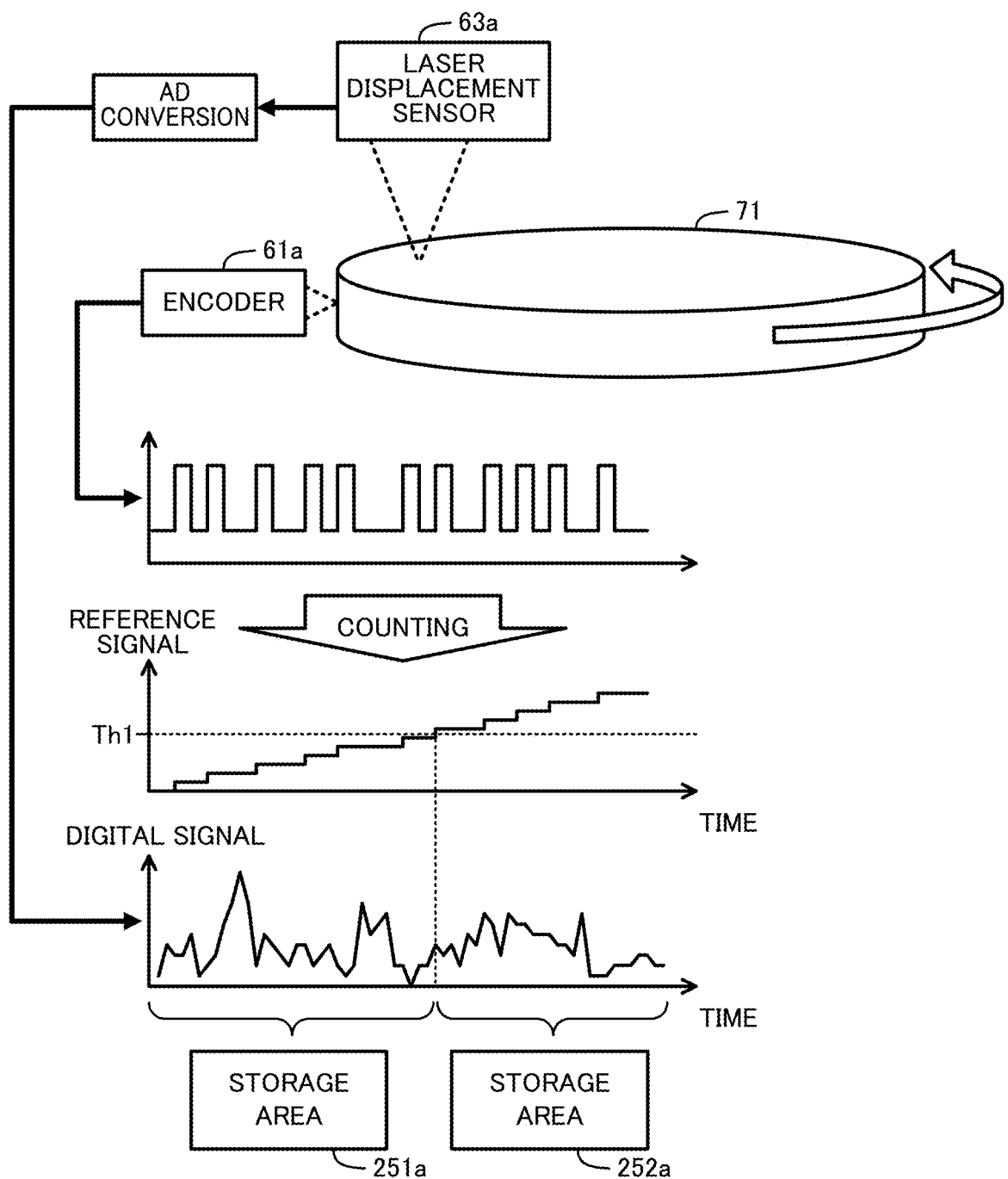
FIG. 2 is a schematic diagram illustrating an exemplary case of switching the storage area according to Embodiment 1.

For example, the following description assumes an exemplary case in which an encoder 61a, which is an example of the device 61, measures the angle of a rotating wafer 71 while a laser displacement sensor 63a, which is an example of the device 63, measures the thickness of the wafer 71, as illustrated in FIG. 2. In this case, the encoder 61a outputs a pulse signal corresponding to the angle while the laser displacement sensor 63a outputs an analog signal indicating the thickness.

The digital signal acquired through AD conversion to the analog signal is logged into a storage area 251a, which is an example of the storage area 251. When the counted number of pulses of the pulse signal exceeds a threshold Th1, the write destination is switched to a storage area 252a, which is an example of the storage area 252, without interruption of logging, resulting in continuous logging of digital signals. In the case illustrated in FIG. 2, the write destination is switched on the basis of the comparison between a reference signal indicating the counted number of pulses and the threshold.

<Configuration of the PLC 100>

Figure 3:
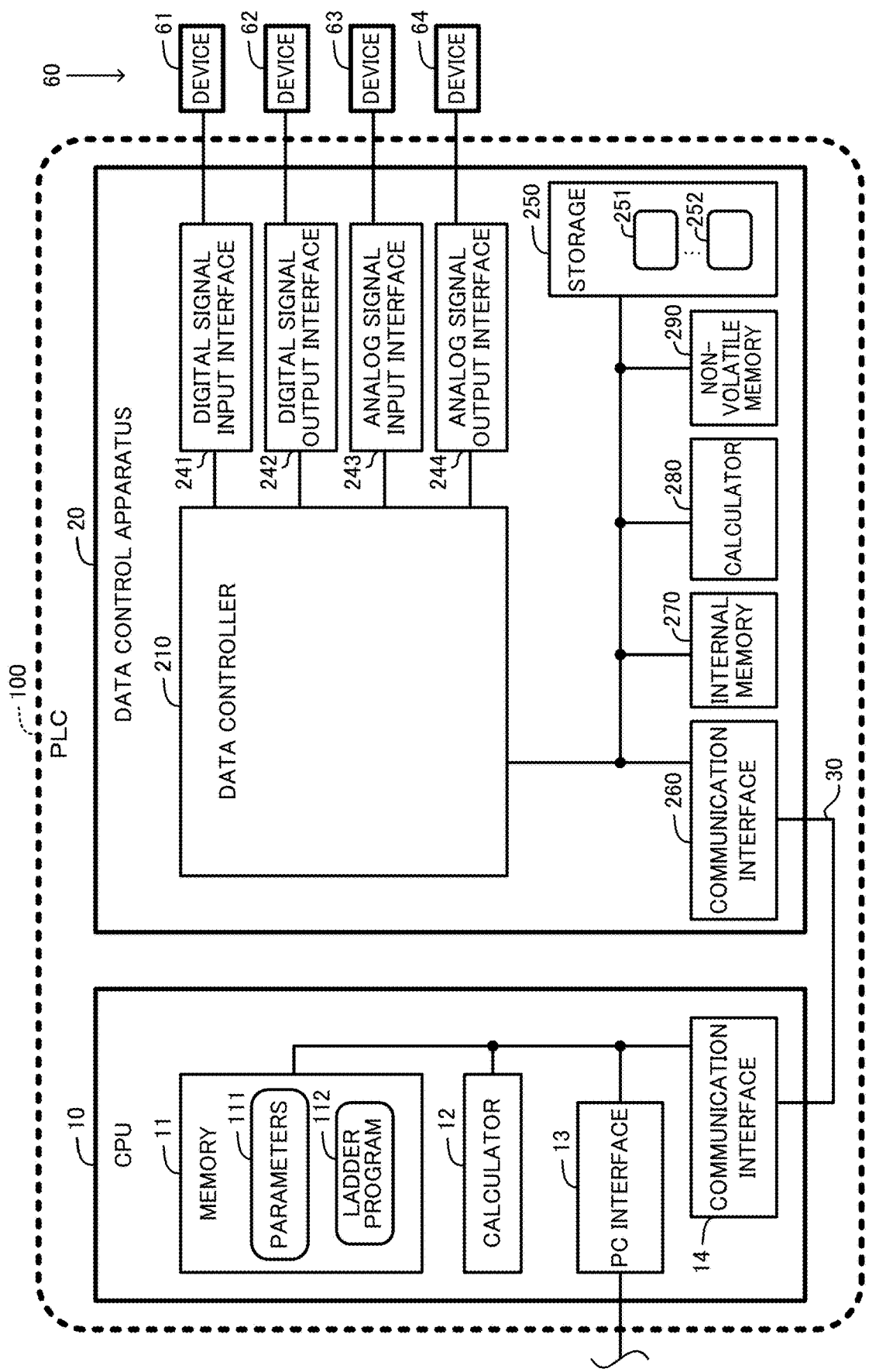
FIG. 3 illustrates a configuration of a PLC according to Embodiment 1.

The PLC 100 achieves not only the logging process as illustrated in FIG. 2 but also various control processes in accordance with the setting at the PC 50. A configuration of the PLC 100 for achieving various control processes is described with reference to FIG. 3. As illustrated in FIG. 3, the CPU 10 and the data control apparatus 20 of the PLC 100 are connected to each other via a communication bus 30 and thus communicate with each other.

The CPU 10 corresponds to an arithmetic processing unit constituting the PLC 100 and executes a ladder program 112. The ladder program 112 serves to operate the apparatuses included in the PLC 100 and control industrial devices. The control achieved by executing the ladder program 112 may involve the control of other non-illustrated apparatuses, as well as the control of the data control apparatus 20. The CPU 10 repetitively conducts the execution of the ladder program 112, output of the result of execution of the ladder program 112, and acquisition of a value used in the ladder program 112, in a predetermined period. This period is called a control period or scan time and is in the order of milliseconds. In other words, the period typically has a length of one millisecond or longer.

As illustrated in FIG. 3, the CPU 10 includes a memory 11 for storing predetermined parameters 111 and the ladder program 112, a calculator 12 for executing the ladder program 112 in accordance with the parameters 111 stored in the memory 11, a PC interface 13 for communicating with the PC 50, and a communication interface 14 for communicating with the data control apparatus 20 via the communication bus 30.

The memory 11 is a non-volatile memory and corresponds to a semiconductor flash memory or magnetic disk, for example. The calculator 12 includes a CPU and a RAM serving as a work area of the CPU. The PC interface 13 includes, for example, a universal serial bus (USB) interface circuit. The communication interface 14 includes a communication interface circuit for communication with the data control apparatus 20.

The data control apparatus 20 corresponds to an input-output control unit or input/output (I/O) unit of the PLC 100, which is attached to the CPU 10 for use. The data control apparatus 20 controls the data contained in digital signals and the data on analog signals, which are transmitted between the data control apparatus 20 and the devices 60. The data control apparatus 20 may also control the data on signals output from the data control apparatus 20 and thereby control the devices 60. In addition to the data controller 210 and the storage 250, the data control apparatus 20 is equipped with a digital signal input interface 241 for receiving digital signals, a digital signal output interface 242 for transmitting digital signals, an analog signal input interface 243 for receiving analog signals, an analog signal output interface 244 for transmitting analog signals, a communication interface 260 for conducting communication via the communication bus 30, an internal memory 270 for storing operation parameters that define the operations of the data controller 210, a calculator 280 for operating the data controller 210 in accordance with the operation parameters, and a non-volatile memory 290 for storing data in case of power shutdown.

The digital signal input interface 241 outputs a digital signal from the device 61 to the data controller 210. The digital signal output interface 242 outputs a digital signal from the data controller 210 to the device 62. The analog signal input interface 243 outputs an analog signal from the device 63 to the data controller 210. The analog signal input interface 243 is an example of a first input interface that receives a device signal from the device 63 as a first device, which is connected to the data control apparatus 20. The device signal indicates a signal from any of the devices 60 that outputs a value to be logged. The analog signal output interface 244 outputs an analog signal from the data controller 210 to the device 64.

A configuration of the data controller 210 is described with reference to FIG. 4. The data controller 210 is a reconfigurable integrated circuit based on hardware and corresponds to a so-called programmable logic device (PLD). The data controller 210 rapidly operates in the order of nanoseconds because of parallel processing. The data controller 210 functions as data control means, among the components of the data control apparatus 20, for writing a digital value generated from an analog signal into either of the storage area 251 or 252. The data controller 210 is equipped with a plurality of general circuit blocks, and a circuit block switching bus 230, which is a communication path that can vary at least one of the combination and the order of use of the general circuit blocks.

In detail, the data controller 210 includes, as the general circuit blocks, a digital input block 211 for receiving a digital signal from the digital signal input interface 241, a digital output block 212 for outputting a digital signal to the digital signal output interface 242, an AD conversion block 213 for converting the analog signal received by the analog signal input interface 243 into a digital signal, a DA conversion block 214 for generating an analog signal to be supplied to the analog signal output interface 244, a counter block 221 for counting numbers, a cam switch block 222 for outputting a value while varying the output value depending on the input value, a logger block 223 for logging the input value, a waveform output block 224 for outputting an analog waveform, a comparison operation block 225 for comparing data, a logical operation block 226 for executing a logical operation, an arithmetic operation block 227 for executing an arithmetic operation, and a filter block 228 for filtering a signal.

Each of the general circuit blocks includes a register for storing execution parameters used in a process to be executed, and data input-output terminals for inputting and outputting data. In detail, the digital input block 211 includes a register 211a and terminals 211b. The digital output block 212 includes a register 212a and terminals 212b. The AD conversion block 213 includes a register 213a and terminals 213b. The DA conversion block 214 includes a register 214a and terminals 214b. The counter block 221 includes a register 221a and terminals 221b. The cam switch block 222 includes a register 222a and terminals 222b. The logger block 223 includes a register 223a and terminals 223b. The waveform output block 224 includes a register 224a and terminals 224b. The comparison operation block 225 includes a register 225a and terminals 225b. The logical operation block 226 includes a register 226a and terminals 226b. The arithmetic operation block 227 includes a register 227a and terminals 227b. The filter block 228 includes a register 228a and terminals 228b.

The digital input block 211 receives a digital signal from the digital signal input interface 241 and outputs this digital signal through one of the terminals 211b to any of the general circuit blocks or the outside of the data controller 210 in accordance with the execution parameters registered in the register 211a. The digital output block 212 receives a digital signal from any of the general circuit blocks or the outside of the data controller 210 through one of the terminals 212b and outputs this digital signal to the digital signal output interface 242 in accordance with the execution parameters registered in the register 212a.

The AD conversion block 213 corresponds to a so-called AD conversion circuit and is an example of AD conversion means for converting an analog signal into a digital signal indicating a digital value. The AD conversion block 213 obtains a digital signal by converting the analog signal from the analog signal input interface 243 through discretization and quantization at a predetermined sampling period and resolution, and outputs the obtained digital signal to any of the general circuit blocks or the outside of the data controller 210, in accordance with the execution parameters registered in the register 213a. The execution parameters define, for example, that the AD conversion block 213 continuously outputs 16-bit digital values corresponding to the analog signals at a level within the range of −10 to +10 V and thus outputs digital signals containing a series of the digital values.

The DA conversion block 214 corresponds to a so-called DA conversion circuit. The DA conversion block obtains an analog signal by converting a digital signal from any of the general circuit blocks or the outside of the data controller 210 through one of the terminals 214b and outputs the obtained analog signal to the analog signal output interface 244, in accordance with the execution parameters registered in the register 214a. The execution parameters define, for example, that the DA conversion block 214 outputs analog signals while varying the level of the analog signals within the range of −10 to +10 V depending on the 16-bit digital values that are sequentially input to the DA conversion block 214.

The counter block 221 counts the number of pulses of a signal input through one of the terminals 221b and outputs the counted number through the other of the terminals 221b in accordance with the execution parameters registered in the register 221a. The cam switch block 222 outputs a value, which depends on the value input through one of the terminals 222b, through the other of the terminals 222b in accordance with the execution parameters registered in the register 222a. The logger block 223 outputs a value, which is input through one of the terminals 223b, to the storage 250 through the other of the terminals 223b to log the data in accordance with the execution parameters registered in the register 223a. The waveform output block 224 sequentially outputs digital values read from the storage 250 through one of the terminals 224b in accordance with the execution parameters registered in the register 224a. The digital signals containing these digital values are subject to DA conversion and then output to the outside of the data control apparatus 20.

The comparison operation block 225 compares the values of data input through one of the terminals 225b and outputs the result of comparison through the other of the terminals 225b in accordance with the execution parameters registered in the register 225a. The logical operation block 226 executes a basic logical operation of a value input through one of the terminals 226b and outputs the result of execution through the other of the terminals 226b in accordance with the execution parameters registered in the register 226a. Examples of the logical operation include logical NOT, logical AND, logical OR, exclusive OR, logical NOR, and logical NAND of bit data input through the one of the terminals 226b. The arithmetic operation block 227 executes an arithmetic operation of a value input through one of the terminals 227b and outputs the result of execution through the other of the terminals 227b in accordance with the execution parameters registered in the register 227a. Examples of the arithmetic operation include addition, subtraction, multiplication, and division of 16-bit word data. The filter block 228 conducts a filtering process in accordance with the execution parameters registered in the register 228a. The execution parameters define, for example, that the filter block 228 outputs an average of values, which are continuously input through one of the terminals 228b, through the other of the terminals 228b as a moving average. The filter block 228 serves to remove noise from the input signal, for example.

Referring back to FIG. 3, the storage 250 includes a volatile semiconductor flash memory. The storage 250 should preferably achieve rapid reading and writing, as described later. The storage 250 serves as storage means having the storage areas 251 and 252 for storing data output from the data controller 210. Although FIG. 3 illustrates a representative example in which the storage 250 has two storage areas 251 and 252, the storage 250 may also have two or more storage areas other than two. The storage 250 has a data capacity of, for example, 10 Mbyte, 1 Gbyte, or 1 Tbyte. The capacity of each of the storage areas 251 and 252 is 1 Mbyte, for example, and may be varied to any capacity.

The communication interface 260 includes an interface circuit for conducting communication via the communication bus 30.

The internal memory 270 includes a volatile semiconductor flash memory. The internal memory 270 should preferably respond rapidly to some extent in accordance with the high-speed internal processing of the data controller 210. The internal memory 270 stores operation parameters. The operation parameters define the order of combined operations of the general circuit blocks. The internal memory 270 may store not only the operation parameters but also information that defines the operations of the data controller 210 in cooperation with the operation parameters, as described later. The information is supplied from the PC 50 via the CPU 10 and written into the internal memory 270.

The calculator 280 reconfigures the general circuit blocks included in the data controller 210 in accordance with the operation parameters stored in the internal memory 270. In detail, the calculator 280 analyzes the operation parameters stored in the internal memory 270 and determines at least one of the combination, the order of use, and the operation details of the general circuit blocks. The calculator 280 then writes execution parameters into the registers 211a, 212a, 213a, 214a, 221a, 222a, 223a, 224a, 225a, 226a, 227a, and 228a of the general circuit blocks, thereby causing the data controller 210 to execute the determined operation. The calculator 280 also automatically evaluates the data obtained by the data controller 210.

The non-volatile memory 290 includes a magnetic memory or semiconductor flash memory. The non-volatile memory 290 stores data equivalent to that stored in the storage 250 and the internal memory 270 in case of power shutdown of the data control apparatus 20. When the data control apparatus 20 is reactivated after power shutdown, the data stored in the non-volatile memory 290 is loaded in the storage 250 and the internal memory 270, thereby ensuring the consistency of data in the storage 250 and the internal memory 270 before and after power shutdown.

<Setting at the PC 50>

Figure 5:
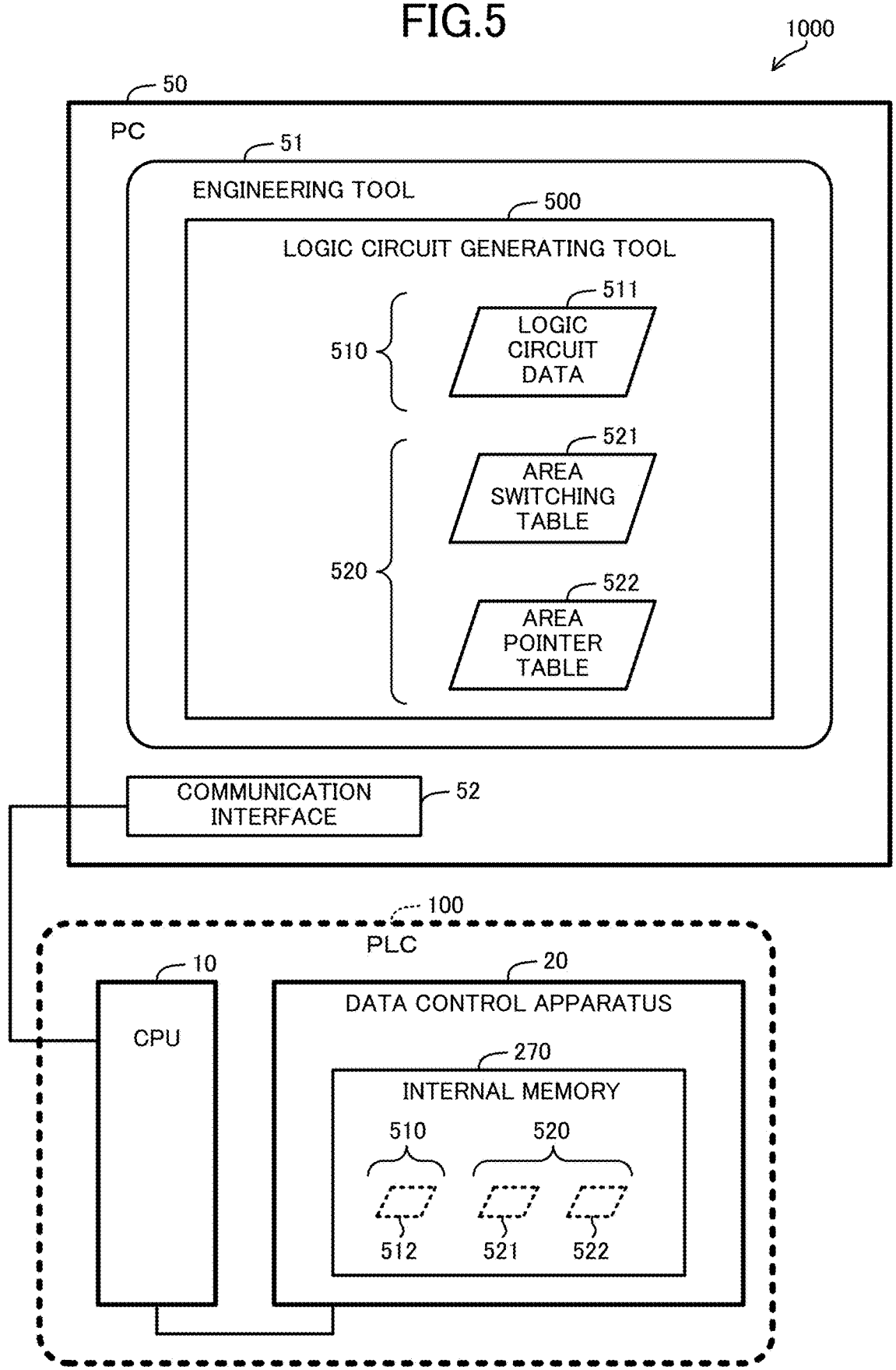
FIG. 5 illustrates data generated by a PC according to Embodiment 1.

The configuration for setting the operation parameters and determining the specific content of control executed by the data controller 210 is described. As illustrated in FIG. 5, the PC 50 includes an engineering tool 51 for generation of the ladder program 112, various settings, and monitoring of the status of the PLC 100, and a communication interface 52 for communicating with the CPU 10.

The engineering tool 51 is a function achieved by execution of software in the PC 50 and serves to allow the user to achieve settings related to the PLC 100. The engineering tool 51 contains a logic circuit generating tool 500 for setting the operations of the data control apparatus 20.

The logic circuit generating tool 500 generates logic circuit data 511 that indicates a drawn diagram and setting of a hardware logic circuit that defines the operations of the data control apparatus 20, and an area switching table 521 and an area pointer table 522 for switching the storage area in the storage 250.

The logic circuit generating tool 500 converts the logic circuit data 511 into operation parameters 512. The logic circuit generating tool 500 then stores the operation parameters 512, the area switching table 521, and the area pointer table 522 into the internal memory 270 of the data control apparatus 20 via the CPU 10 and the communication bus 30.

The logic circuit data 511 and the operation parameters 512 constitute setting information 510 that indicates setting of the operations of the data controller 210. Although FIG. 5 illustrates a configuration in which the setting information 510 is equivalent to the logic circuit data 511 and the operation parameters 512, this configuration is a mere example. For example, the setting information 510 may contain the logic circuit data 511 generated by the logic circuit generating tool 500 and other data. The area switching table 521 and the area pointer table 522 constitute correlation information 520 that associates the addresses of the storage areas with the values of the reference signals serving as thresholds for switching the storage area. The correlation information 520 indicates the respective addresses of the storage areas 251 and 252 included in the storage 250 and conditional values, which is described later, associated with these storage areas 251 and 252. The communication interface 260 of the data control apparatus 20 receives the setting information 510 and the correlation information 520, and the calculator 280 stores the information into the internal memory 270.

Figure 6:
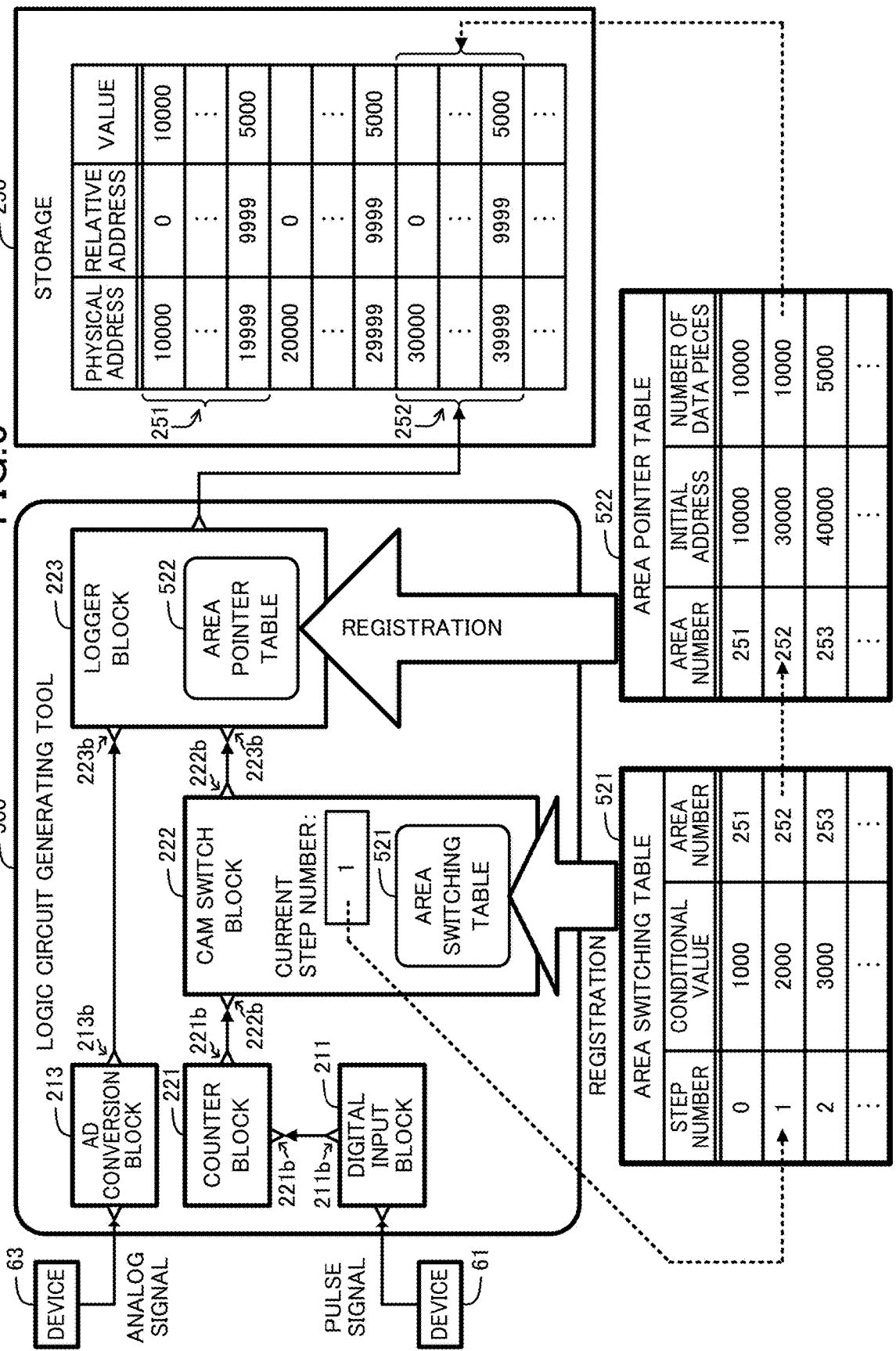
FIG. 6 illustrates an example of drawn logic circuit diagram according to Embodiment 1.

FIG. 6 illustrates an example of a drawn logic circuit diagram set by the user using the logic circuit generating tool 500. In the example in FIG. 6, the analog signal from the device 63 is input to the AD conversion block 213, and the signal output through one of the terminals 213b of the AD conversion block 213 is input to one of the terminals 223b of the logger block 223. The AD conversion block 213 continues to sequentially output digital values to the logger block 223 in the period in the order of nanoseconds in synchronization with the internal control clock of the data controller 210.

Also, the pulse signal from the device 61 is input to the digital input block 211, and the signal output through one of the terminals 211b of the digital input block 211 is input to one of the terminals 221b of the counter block 221. The counter block 221 thus functions as counter means for counting the number of rising edge of pulses and outputting a signal indicating the counted number of pulses. The operation of counting the number and outputting the counted number is performed by the counter block 221 in the period in the order of nanoseconds in synchronization with the internal control clock of the data controller 210. The number counted by the counter block 221 is output through the other of the terminals 221b of the counter block 221 and input to one of the terminals 222b of the cam switch block 222. The cam switch block 222 outputs a value associated with the counted number through the other of the terminals 222b to another of the terminals 223b of the logger block 223.

For example, the user draws a logic circuit diagram by arranging the objects corresponding to the respective general circuit blocks and connecting the objects to each other by the lines representing signal lines, while viewing a screen similar to the logic circuit generating tool 500 in FIG. 6. In the case where the logic circuit is set as illustrated in FIG. 6, the logic circuit data 511 is generated that indicates the combination of the AD conversion block 213, the logger block 223, the digital input block 211, and the counter block 221, and the signal paths corresponding to the order of processes executed by these blocks. The logic circuit generating tool 500 then converts the logic circuit data 511 into the operation parameters 512, and transmits the operation parameters 512 via the CPU 10 and the communication bus 30 to the data control apparatus 20. The operation parameters 512 received by the data control apparatus 20 is stored into the internal memory 270, as illustrated in FIG. 5.

In the example illustrated in FIG. 6, the user registers the area switching table 521 in the cam switch block 222, and registers the area pointer table 522 in the logger block 223.

As illustrated in FIG. 7, the area switching table 521 contains conditional values to be compared with an input value, area numbers for identifying the storage areas, and step numbers serving as indexes for associating the conditional values with the area numbers. For example, the step number "1" is an index for associating the conditional value "2000" with the area number "252". In FIG. 7, the area numbers corresponding to the storage areas 251 and 252 are equal to the reference symbols of the storage areas 251 and 252, respectively.

When the area switching table 521 is registered in the cam switch block 222 as illustrated in FIG. 6, the cam switch block 222 functions as comparison means for acquiring a reference signal and comparing the value of the reference signal with the conditional values. In detail, the cam switch block 222 reads the area switching table 521 from the internal memory 270, and compares the value output from the counter block 221 with the conditional values. On the basis of this comparison, the cam switch block 222 outputs a signal indicating the area number. In detail, the cam switch block 222 outputs an area number associated with the minimum one of the conditional values that is larger than the value input from the counter block 221. For example, for an input value in the range from 0 to 999, the area number "251" associated with the conditional value "1000" is output. For an input value in the range from 1,000 to 1,999, the area number "252" associated with the conditional value "2000" is output. In FIG. 6, the dashed arrows represent that the area number "252" associated with the current step number "1" is output.

As illustrated in FIG. 8, the area pointer table 522 is table data that associates the area numbers common to the area switching table 521, the initial physical addresses of the respective storage areas, and the numbers of data pieces acceptable in the respective storage areas, with each other. When the area pointer table 522 is registered in the logger block 223 as illustrated in FIG. 6, the logger block 223 functions as logger means for switching the storage area into which digital values are written on the basis of the comparison in the cam switch block 222 and writing digital values. In detail, the logger block 223 reads the area pointer table 522 from the internal memory 270, and sequentially stores the digital values output from the AD conversion block 213 into the storage area corresponding to the area number output from the cam switch block 222. For example, while the area number "252" is being output from the cam switch block 222, the logger block 223 sequentially accumulates digital values into the area starting from the address "30000" that can accommodate 10,000 data pieces.

When the area number output from the cam switch block 222 is changed, the logger block 223 switches the storage area for storing digital values to another storage area associated with a new area number. This switching operation can be repetitively executed in a logging period set by the execution parameters registered in the register 223a. This logging period may be synchronized with the internal control clock of the data controller 210, or may have a length several to several tens of times longer than the length of the internal control clock, for example, provided that the logging period is significantly shorter than the scan time of the CPU 10. That is, the storage area is switched in the period similar to the period of execution of AD conversion in the AD conversion block 213. This configuration can achieve rapid switching of storage area and continuous logging of digital values without losing any digital value provided through AD conversion.

<Logging Process in the Data Control Apparatus 20>

The logging process executed by the data control apparatus 20 in which the operations illustrated in FIG. 6 are set is explained. The logging process is achieved by execution of processes by the individual general circuit blocks in synchronization with the internal control clock, as illustrated in FIG. 6. For example, the AD conversion block 213 conducts AD conversion of the analog signal input from the device 63 and output of the digital value in synchronization with the internal control clock. The digital input block 211 outputs the pulse signal from the device 61 to the counter block 221 in synchronization with the internal control clock. The counter block 221 outputs the counted number of rising edge of pulses contained in the pulse signal to the cam switch block in synchronization with the internal control clock.

The cam switching process in the cam switch block 222 and the logging process in the logger block 223 is explained with reference to FIGS. 9 to 11.

Figure 9:
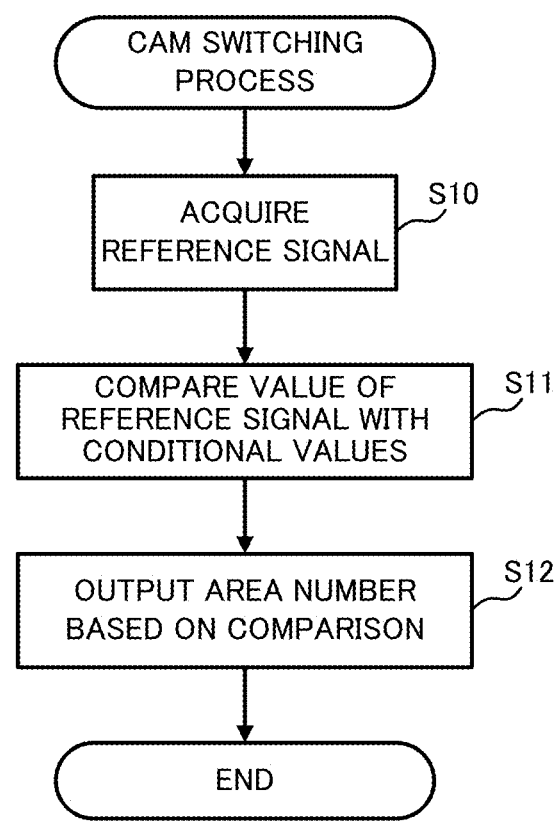
FIG. 9 is a flowchart illustrating a cam switching process according to Embodiment 1.

In the cam switching process illustrated in FIG. 9, the cam switch block 222 acquires a reference signal (Step S10). The reference signal is referred to for the purpose of switching of the storage area. In the example illustrated in FIG. 6, the reference signal corresponds to the signal indicating the counted number output from the counter block 221.

The cam switch block 222 then compares the value of the reference signal with the conditional values (Step S11). Specifically, the cam switch block 222 compares the value of the reference signal with the individual conditional values contained in the area switching table 521. Alternatively, the cam switch block 222 may compare the value of the reference signal with any one of the conditional values without comparison with the individual conditional values. For example, in the example illustrated in FIG. 7, the value of the reference signal in the range from 0 to 999 is compared with the conditional value "1000", and this conditional value to be compared is changed to "2000" when the value of the reference signal reaches 1,000.

Referring back to FIG. 9, after Step S11, the cam switch block 222 outputs the area number on the basis of the comparison (Step S12). Specifically, the cam switch block 222 outputs the area number, which is associated with the minimum conditional value larger than the value of the reference signal, to the logger block 223. The cam switching process is then terminated. The above-explained cam switching process is repeated in synchronization with the internal control clock.

Figure 10:
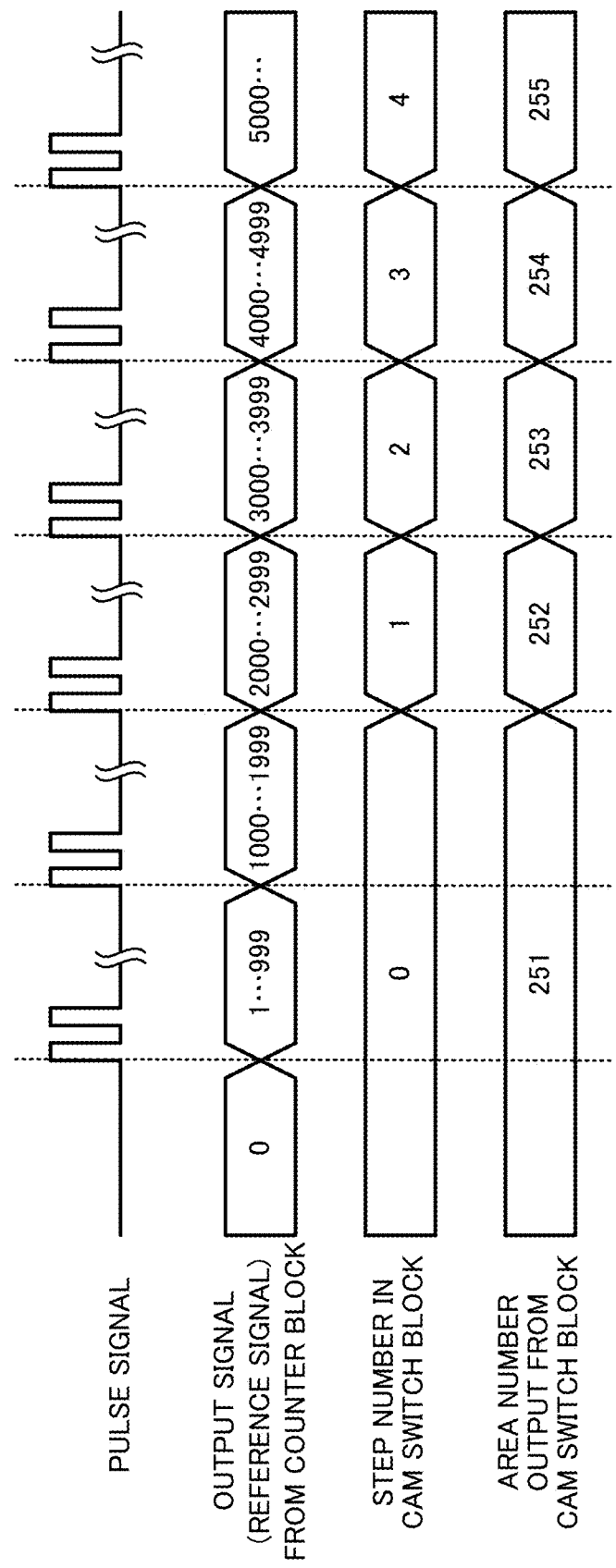
FIG. 10 illustrates transition of a reference signal and an area number according to Embodiment 1.

FIG. 10 illustrates the transition of the waveform of the pulse signal, output signal from the counter block 221, step number in the area switching table 521 which the cam switch block 222 refers to in accordance with this output signal, and the area number output from the cam switch block 222. As illustrated in FIG. 10, the counter block 221 counts the number of rising edge of pulses of the pulse signal and continues to increment the count value. The cam switch block 222 compares the count value with one of the conditional values in the area switching table 521, and changes the step number to the number larger than the original number by one when the count value reaches the conditional value or larger. For example, in the case of a count value of 2,999, the cam switch block 222 selects the step number "1" and outputs the area number "252". When the next count value "3,000" is received from the counter block 221, the step number is changed to the step number "2" and the area number is changed to the area number "253", as a result of comparison of the received count value with the conditional values.

Figure 11:
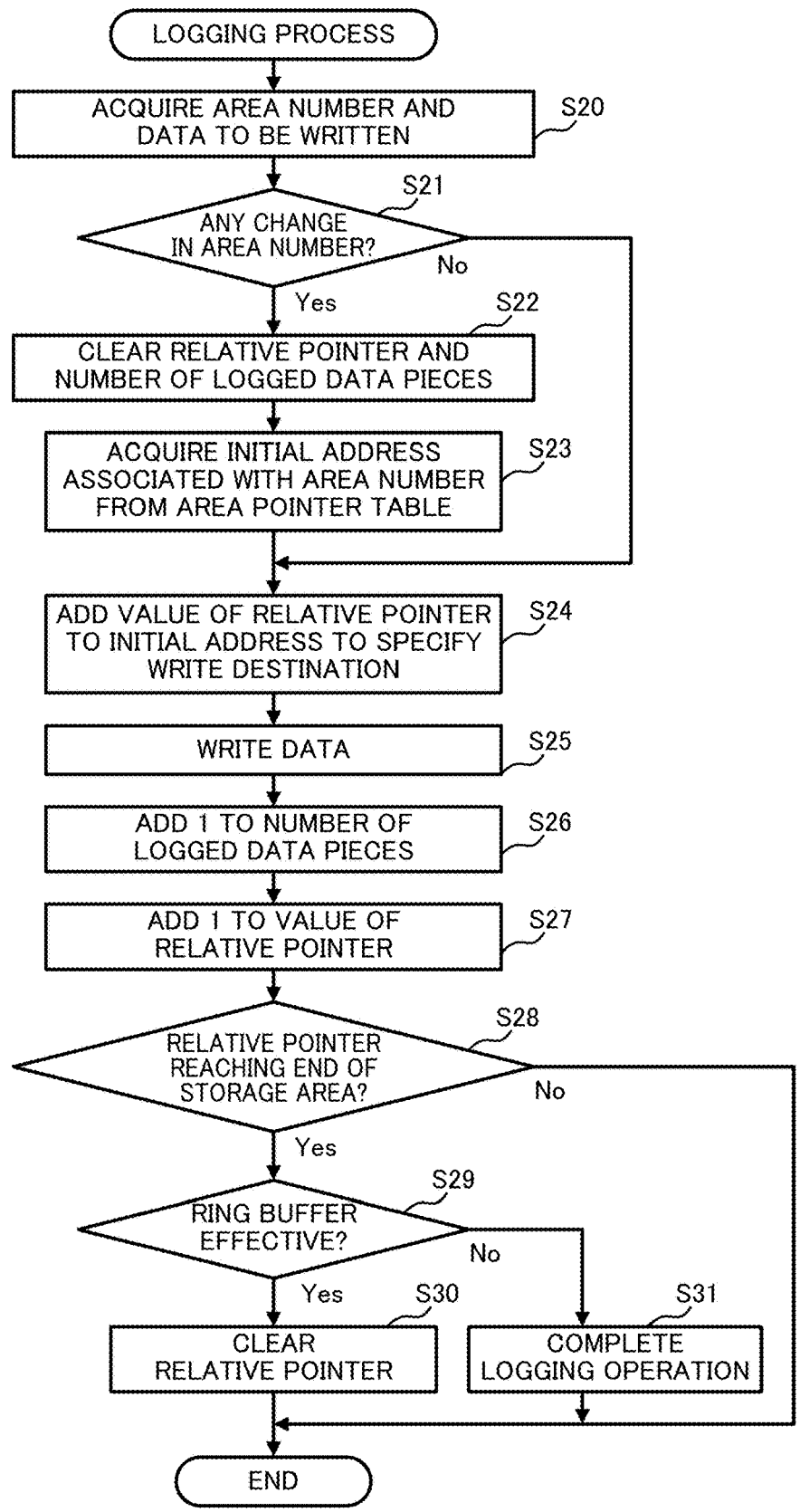
FIG. 11 is a flowchart illustrating a logging process according to Embodiment 1.

FIG. 11 illustrates the logging process executed by the logger block 223.

In the logging process, the logger block 223 acquires the area number and data to be written (Step S20). Specifically, the logger block 223 simultaneously obtains the area number that was output from the cam switch block 222 and has arrived at the other terminal 223b, and the digital value, which is the data to be written, that was output from the AD conversion block 213 and has arrived at the one terminal 223b.

The logger block 223 then determines whether any change has occurred in the area number output from the cam switch block 222 (Step S21). Specifically, the logger block 223 determines whether the area number acquired in Step S20 differs from the area number that was used in the previous data logging process in the logger block 223. When determining no change in the area number (Step S21; No), the logger block 223 proceeds to Step S24.

In contrast, when determining any change in the area number (Step S21; Yes), the logger block 223 clears the relative pointer and the number of logged data pieces (Step S22). The relative pointer indicates the relative position for storing digital values in a single storage area in the form of an offset from the initial address. The number of logged data pieces indicates the number of digital values continuously written in the single storage area. When a positive determination is made in Step S21, the storage area into which digital values are written is changed, and the logger block 223 therefore sets the relative pointer and the number of logged data pieces to 0.

The logger block 223 then acquires the initial address corresponding to the area number, which is determined to have a change in Step S21, from the area pointer table 522 (Step S23).

The logger block 223 then adds the value of the relative pointer to the initial address and thereby specifies the position for storing digital values (Step S24). Specifically, the logger block 223 adds the value of the relative pointer to the initial address of the storage area, which is the current write destination, and thereby specifies the physical address of write destination.

The logger block 223 then writes data at the position specified in Step S24 (Step S25). Specifically, the logger block 223 stores the digital values acquired from the AD conversion block 213 in the address specified in Step S24.

The logger block 223 then adds 1 to the number of logged data pieces (Step S26), and adds 1 to the value of the relative pointer (Step S27). The logger block 223 then determines whether the current relative pointer has reached the end of the storage area (Step S28). Specifically, the logger block 223 refers to the area pointer table 522 and determines whether the value of the relative pointer is equal to the value calculated by subtracting 1 from the number of data pieces acceptable in the storage area, which is the current write destination. For example, during sequential storage of digital values into the storage area 252 in the example illustrated in FIG. 8, the logger block 223 determines whether the value of the relative pointer is equal to "9,999".

When determining that the relative pointer has not reached the end (Step S28; No), the logger block 223 terminates the logging process. In contrast, when determining that the relative pointer has reached the end (Step S28; Yes), the logger block 223 determines whether a ring buffer is effective (Step S29). Specifically, the logger block 223 refers to the register 223a and determines whether the flag indicating the effectiveness of a ring buffer in the storage area is in an ON or OFF state. The effectiveness of a ring buffer may be set in the logic circuit data 511 instead of the register 223a. Alternatively, the ring buffer may be set in the area switching table 521 or the area pointer table 522 for each of the storage areas.

When determining that a ring buffer is effective (Step S29; Yes), the logger block 223 clears the relative pointer, and sets the value of the relative pointer to 0 (Step S30). Accordingly, when the completion of writing of digital values until the end of the storage area is followed by re-execution of the logging process without switching the storage area, digital values are sequentially written from the initial address of the same storage area again, resulting in repetition of data storage. The logging process is then terminated.

In contrast, when determining that a ring buffer is not effective (Step S29; No), the logger block 223 determines completion of the logging operation (Step S31), and terminates the logging operation in the current storage area. The logger block 223 may continue the logging operation in another storage area or terminate the logging operation. The logger block 223 may also inform the PC 50 of completion of the logging operation via the CPU 10. The logging process is then terminated.

The logged data is used by the ladder program 112. For example, the logged data may be displayed to the user, may be referred to in another process, or may be transferred to the PC 50.

This logging process is repetitively executed in a logging period set by the execution parameters registered in the register 223a.

<Advantageous Effects of the Data Control Apparatus 20 According to Embodiment 1>

As explained above, the analog signal input interface 243 receives an analog signal, which is a device signal, from the device 63 serving as the first device, and the AD conversion block 213 converts the analog signal into a digital signal indicating a digital value. The device 61 serving as a second device outputs a pulse signal, which is an input signal to the data control apparatus 20. The cam switch block 222 acquires a reference signal generated from the pulse signal, and compares the count value, which is the reference signal, with the conditional values in the area switching table 521. The logger block 223 then switches the storage area into which digital values are written, on the basis of the comparison in the cam switch block 222. This configuration can achieve selection of the storage area into which digital values are written, depending on the value of the reference signal. The configuration can thus improve the convenience of the process on the analog signals output from the device 63.

Specifically, the data control apparatus 20 can continue the logging operation while rapidly switching the storage area in the order of nanoseconds by means of the hardware process, depending on the value of the reference signal generated from the input signal, without being affected by the scan time of the CPU 10 or the program processing speed.

In more detail, the data control apparatus 20 is equipped with the digital signal input interface 241 serving as a second input interface for receiving the input signal from the device 61. This input signal is a pulse signal. The data controller 210 includes the counter block 221 for counting the number of pulses contained in this pulse signal and outputting a reference signal indicating the counted number. The data control apparatus 20 can thus switch the storage area depending on the state of the pulse signal.

In addition, the logger block 223 switches the storage area into which digital values are written to the storage area having the address associated with the minimum conditional value larger than the value of the reference signal. The cam switch block 222 thus is not required to compare the value of the reference signal with all the conditional values, leading to a reduction in the processing load.

Although the execution parameters registered in the register 223a define whether the logger block 223 uses the storage area as a ring buffer in the above-explained configuration, this configuration is a mere example. The logger block 223 may use the storage area as a ring buffer or not as a ring buffer regardless of the execution parameters. Alternatively, the effectiveness of a ring buffer may be excluded from the items of setting achieved by the logic circuit generating tool 500.

The comparison and determinations conducted by the cam switch block 222 and the logger block 223 in the above-explained configuration may also be conducted by the comparison operation block 225, the logical operation block 226, or the calculator 280. For example, the execution parameters may define that the comparison operation block 225 compares the value output from the counter block 221 with the value output from the cam switch block 222 and outputs the data indicating whether the latter value is larger or not to the cam switch block 222.

Embodiment 2

Embodiment 2 is described while focusing on the differences from Embodiment 1. The components identical or corresponding to each other are provided with the same reference symbol as that in Embodiment 1 without redundant description or with simplified description. Although the storage area is switched depending on the state of the pulse signal in Embodiment 1, the storage area may also be switched depending on the state of an analog signal different from the data to be logged. The following description is directed to an embodiment in which the storage area is switched depending on the level of an analog signal.

Figure 12:
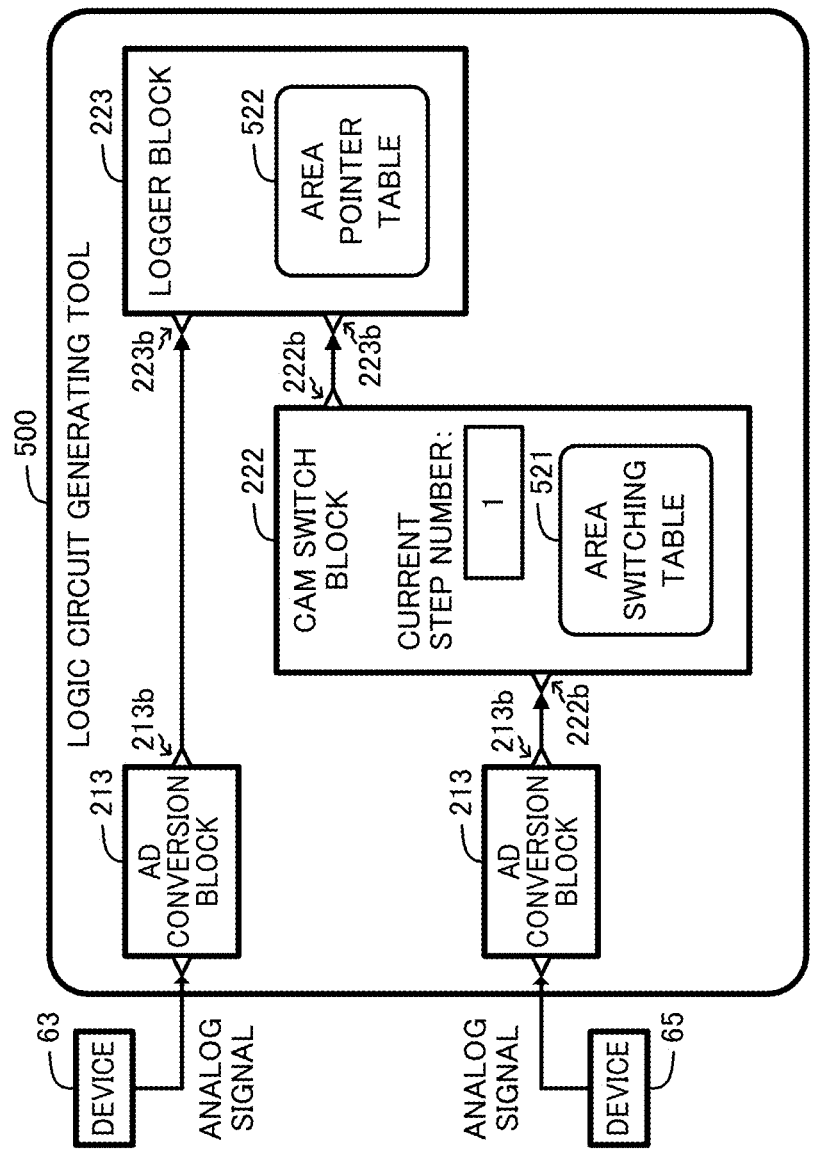
FIG. 12 illustrates an example of drawn logic circuit diagram according to Embodiment 2.

FIG. 12 illustrates an example of a drawn logic circuit diagram set by the user using the logic circuit generating tool 500. The data control apparatus 20 receives an analog signal from a device 65. In detail, the data control apparatus 20 is connected to the devices 63 and 65, and the analog signal input interface 243 outputs analog signals from the respective devices 63 and 65 to the data controller 210. Then, as illustrated in FIG. 12, the analog signal from the device 65 is input to the AD conversion block 213, and the digital signal output through one of the terminals 213b of the AD conversion block 213 is input to one of the terminals 222b of the cam switch block 222. The cam switch block 222 and the logger block 223 function in the same manner as in Embodiment 1.

As described above, in the embodiment in which the storage area for storing data on an analog signal from the device 63 is switched depending on another analog signal from the device 65, the data control apparatus 20 also brings about the same effects as in Embodiment 1. Specifically, the data control apparatus 20 is equipped with the analog signal input interface 243 for receiving an analog signal, which is an input signal from the device 65. The AD conversion block 213 converts this analog signal into a digital signal, which is a reference signal, and thereby generates the reference signal. In detail, the AD conversion block 213 converts the level of the analog signal, which is the device signal, from the device 63 into a digital value, and converts the analog signal, which is the input signal, from the device 65 into a digital signal, which is the reference signal. The data control apparatus 20 can thus switch the storage area depending on the state of the analog signal from the device 65.

Embodiment 3

Embodiment 3 is described while focusing on the differences from Embodiment 1. The components identical or corresponding to each other are provided with the same reference symbol as that in Embodiment 1 without redundant description or with simplified description. Although the storage area is switched depending on the input signal from the external device in Embodiments 1 and 2, the reference signal for switching the storage area may be generated inside the data control apparatus 20. The following description is directed to an embodiment in which the data control apparatus 20 switches the storage area at timings generated in the internal clock.

Figure 4:
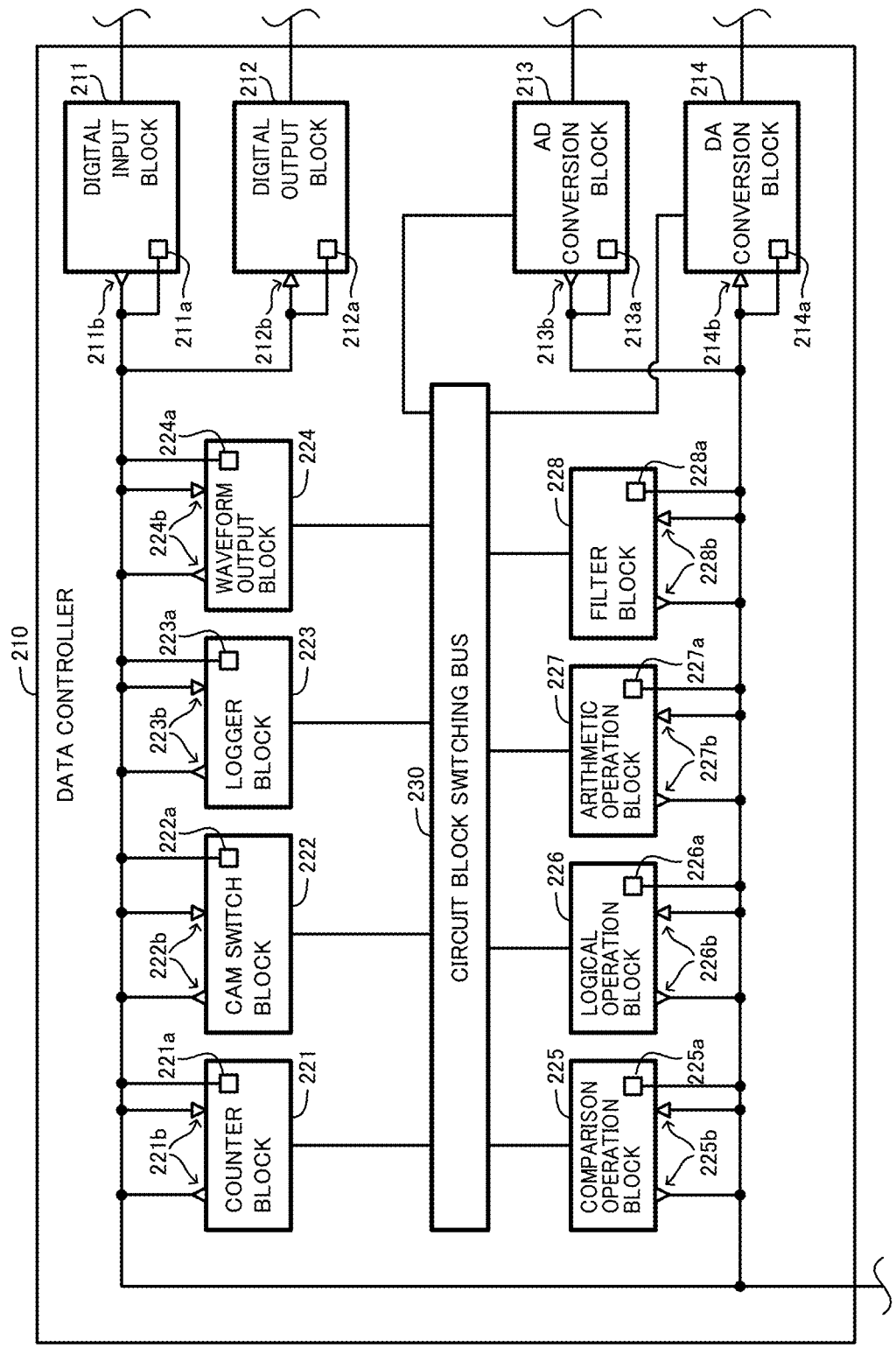
FIG. 4 illustrates a configuration of a data controller according to Embodiment 1.
Figure 13:
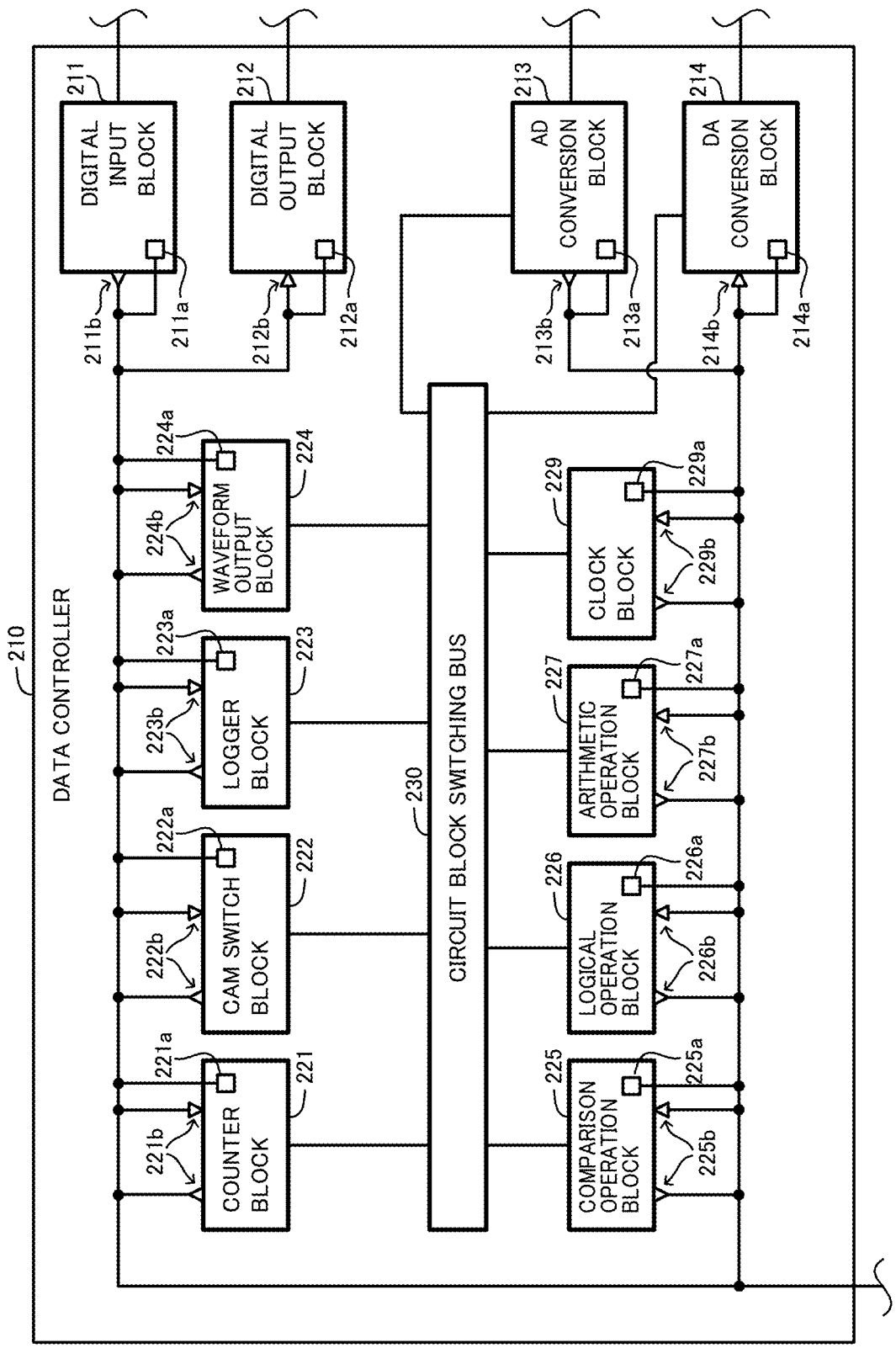
FIG. 13 illustrates a configuration of a data controller according to Embodiment 3.

FIG. 13 illustrates an exemplary configuration of the data controller 210 according to the embodiment, which includes a clock block 229 in place of the filter block 228 in FIG. 4. The clock block 229 functions as the internal control clock of the data controller 210 for generating clock signals and supplying the clock signals to the general circuit blocks. The period of the clock signals is in the order of nanoseconds, specifically, one to ten nano seconds. The clock block 229 is not illustrated in FIG. 4 but may be included in the data controller 210 according to Embodiment 1 or 2.

The clock block 229 includes a register 229*a* and terminals 229*b*. The clock block 229 outputs clock signals through one of the terminals 229*b* in accordance with the execution parameters registered in the register 229*a*.

Figure 14:
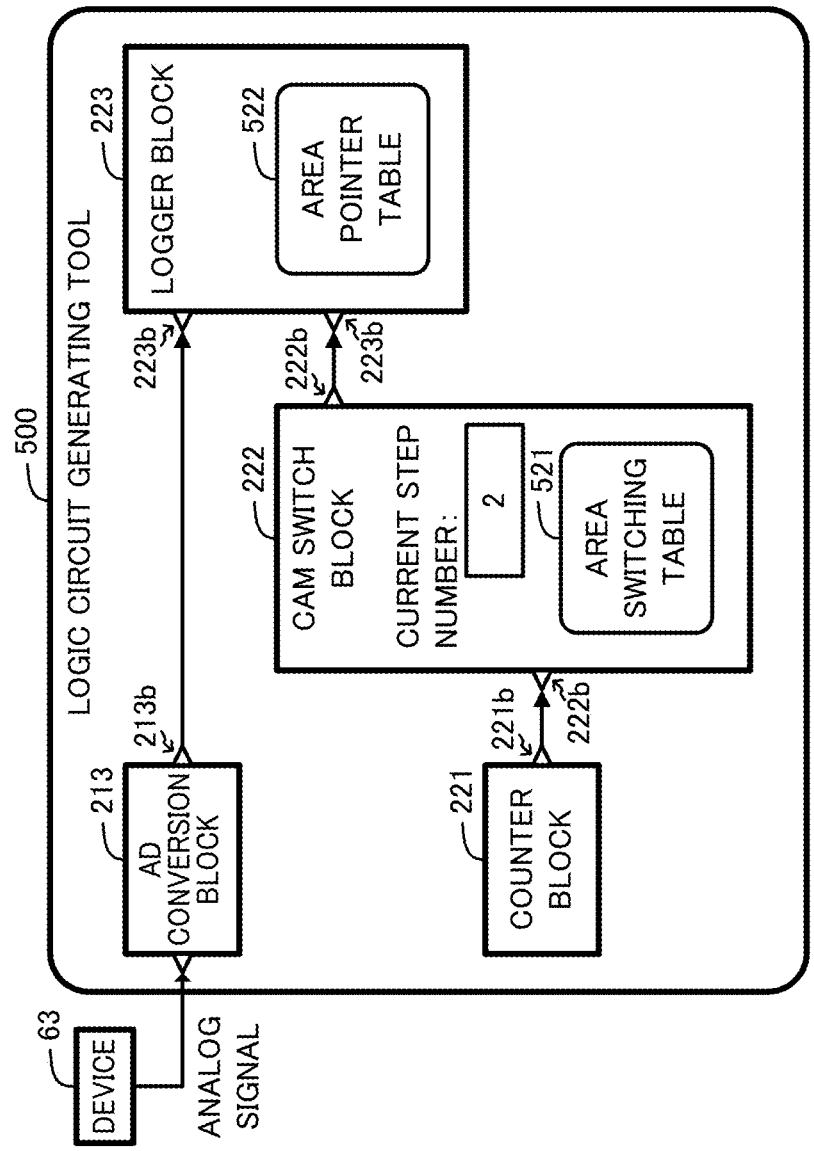
FIG. 14 illustrates an example of drawn logic circuit diagram according to Embodiment 3.

FIG. 14 illustrates an example of a drawn logic circuit diagram set by the user using the logic circuit generating tool 500. The counter block 221 illustrated in FIG. 14 is provided with a function of ring counter operating in the period desired by the user. The counter block 221 counts the clock signals from the clock block 229. When the counted number reaches the number corresponding to the period that was preliminarily set using the logic circuit generating tool 500, the counter block 221 executes a counting-up or counting-down operation of the ring counter, and outputs a count value through one of the terminals 221*b*. The count value is input to the cam switch block 222 through one of the terminals 221*b*. The cam switch block 222 and the logger block 223 function in the same manner as in Embodiment 1.

As described above, the counter block 221 starts counting the period of periodic signals generated by the clock block 229 from a certain time and outputs a reference signal indicating the counted number. The cam switch block 222 then compares the counted number with the conditional values. The logger block 223 then switches the storage area on the basis of this comparison and continues the logging operation. That is, the timings in the period of nanoseconds desired by the user are generated regardless of an input from an external device, and the user sets the conditional values in the area switching table 521. This configuration can thus achieve flexible switching of the storage area with high accuracy.

Embodiment 4

Embodiment 4 is described while focusing on the differences from Embodiment 1. The components identical or corresponding to each other are provided with the same reference symbol as that in Embodiment 1 without redundant description or with simplified description. Although the storage area is switched depending on the value of the reference signal in Embodiments 1 to 3, the user may directly designate the storage area and thereby achieve the desired logging operation more flexibly. The following description is directed to an embodiment in which the storage area is switched in accordance with a direct instruction from the user.

Figure 15:
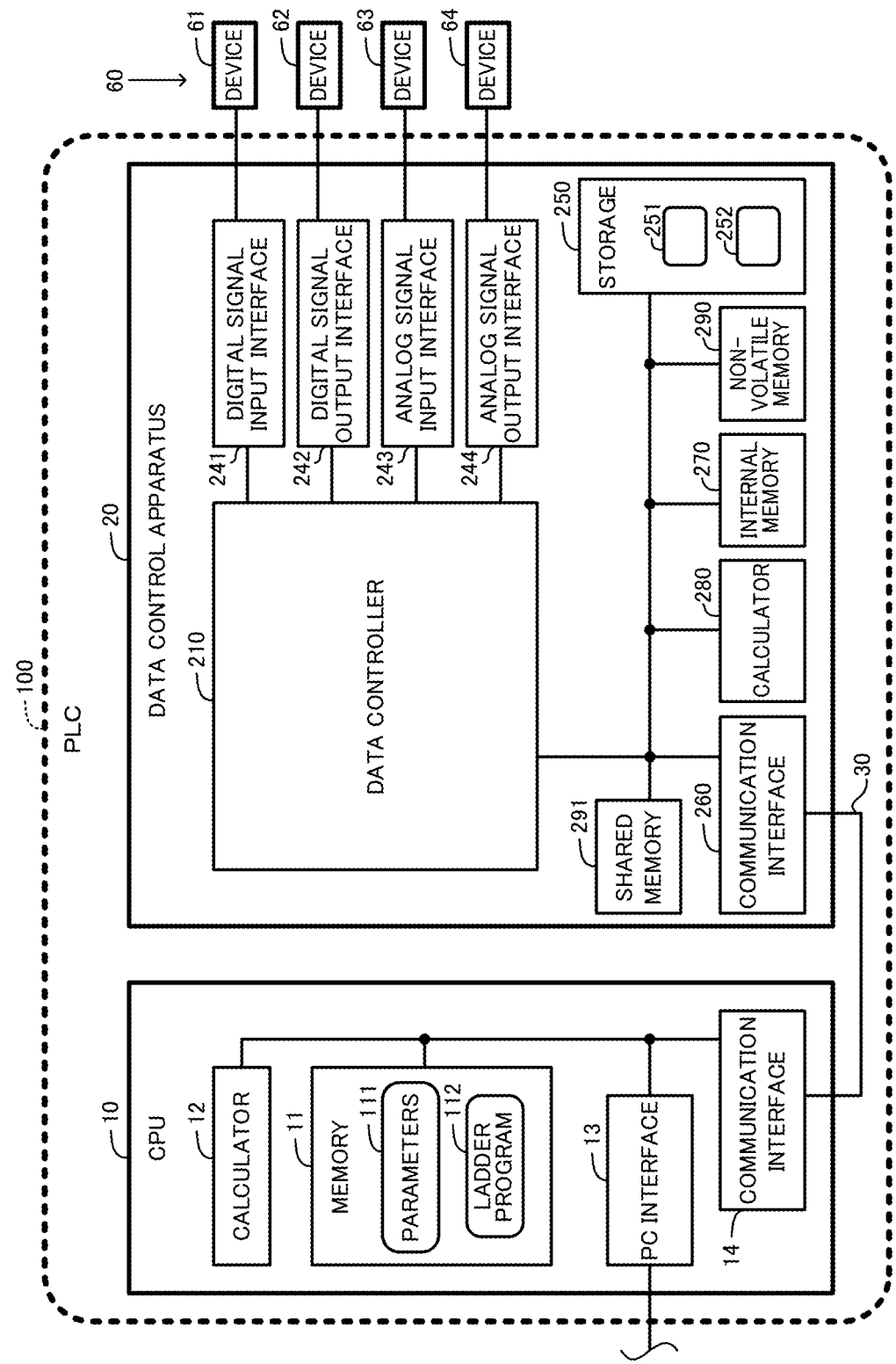
FIG. 15 illustrates a configuration of a PLC according to Embodiment 4.

As illustrated in FIG. 15, the data control apparatus 20 according to the embodiment is equipped with a shared memory 291 shared by the data control apparatus 20 and the CPU 10. The shared memory 291 includes a semiconductor flash memory. The shared memory 291 may be a volatile or non-volatile memory and should preferably respond rapidly to some extent in accordance with the high-speed internal processing of the data controller 210. The data controller 210 and the calculator 280 of the data control apparatus 20 are allowed to write and read data into and from the shared memory 291. The CPU 10 is also allowed to write and read data without any complicated communication processing.

Figure 16:
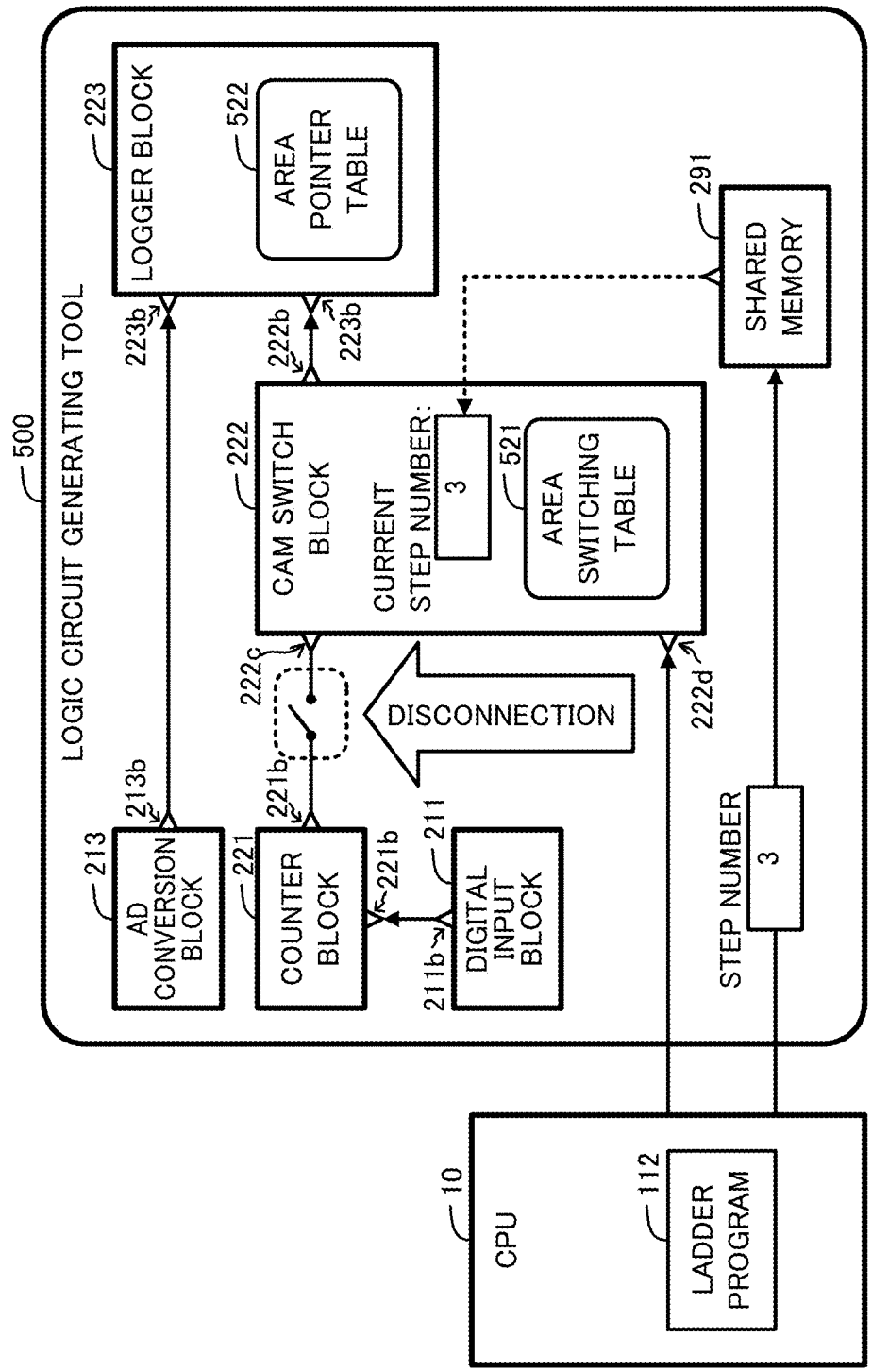
FIG. 16 illustrates an example of drawn logic circuit diagram according to Embodiment 4.

FIG. 16 illustrates an example of a drawn logic circuit diagram set by the user using the logic circuit generating tool 500. As illustrated in FIG. 16, the CPU 10 executing the ladder program 112 controls the cam switch block 222. In detail, an external operation switching signal is input from the ladder program 112 to a terminal 222*d* of the cam switch block 222. When receiving this signal, the cam switch block 222 stops acquiring the count value input through a terminal 222*c* and skips the process of checking the count value against the area switching table 521. It should be noted that the terminals 222*c* and 222*d* correspond to the terminals 222*b* illustrated in FIG. 4.

The cam switch block 222 then links the active step number to a specific address of the shared memory 291. The active step number indicates the step number corresponding to the area number to be output. To link a step number to an address indicates to make the step number in synchronization with the value stored in the address.

The CPU 10 also stores an instruction value from the user in the above-mentioned address of the shared memory 291. When the value in the above-mentioned address of the shared memory 291 is forcibly updated by the ladder program 112 during input of the external operation switching signal to the terminal 222*c* of the cam switch block 222, the updated value is immediately reflected in the cam switch block 222. The cam switch block 222 then outputs the area number, which is associated in the area switching table 521 with the step number written in the shared memory 291.

As described above, the CPU 10 designates the area number and thus designates the storage area into which data is written. The logger block 223 then switches the storage area into which digital values are written to the storage area indicated by the instruction value designated by the user. Specifically, the communication interface 260 illustrated in FIG. 3 receives the step number, which is the instruction value from the user, and the logger block 223 switches the storage area into which digital values are written to the storage area associated with the received step number. The user can thus designate the storage area at a desired timing by directly adjusting the active step number in the cam switch block 222.

The instruction value from the user may also be an area number instead of the step number. Alternatively, the shared memory 291 may be referred to by the logger block 223 without being referred to by the cam switch block 222. In the case where the logger block 223 refers to the shared memory 291, in response to reception of an external operation switching signal, the logger block 223 stops acquiring a signal from the cam switch block 222 and acquires the area number or address from the shared memory 291. The logger block 223 then sequentially writes digital values from the initial address associated with the acquired area number in the area pointer table 522 or from the acquired address.

Embodiment 5

Embodiment 5 is described while focusing on the differences from Embodiment 1. The components identical or corresponding to each other are provided with the same reference symbol as that in Embodiment 1 without redundant description or with simplified description. Although the storage area into which data is written is switched in Embodiment 1, the storage area from which data is read may be switched.

Due to an increase in the response speed of sensors in recent years, analog signals for inspection to be input to the sensors have been required to be more rapidly output and have smoother waveforms, for the purpose of reduction in tact time and improvement of the inspection accuracy of the sensors. One of the conceivable techniques to satisfy this requirement is conversion of digital signals into analog signals and output of these analog signals. For example, International Publication No. WO 2012/042556 discloses a technique in which a D/A conversion apparatus included in a PLC sequentially executes digital to analog (DA) conversion to a waveform data string, which is stored in a built-in memory in the chronological order, and outputs the resulting analog signals. In this technique, the D/A conversion apparatus does not acquire digital signals from the outside. This configuration can output a smooth waveform on the basis of the data that is rapidly read in a period as short as the period of DA conversion.

The market also demands the function of rapidly changing the waveform pattern of an analog signal output from a PLC to a device, depending on the values of various signals. Unfortunately, the technique disclosed in the above-mentioned literature was devised without consideration of the function of changing the waveform pattern of an analog signal to be output. That is, the changing of the waveform pattern must be achieved by a temporary stop of output of an analog signal or by a preliminary operation of determining the timings of changing the waveform pattern of the analog signal. From this viewpoint, the technique should be revised to improve the convenience of the process on signals transmitted between a device and an apparatus.

The following description is directed to an embodiment in which the storage area from which digital values are sequentially read is switched and analog signals generated through DA conversion of these digital values are output. In the following description, the signals output from the PLC 100 to the devices 60 may be referred to as "output signals" as required. The input signals input from the devices 60 to the PLC 100 are used to switch the storage area from which digital values are read.

Figure 17:
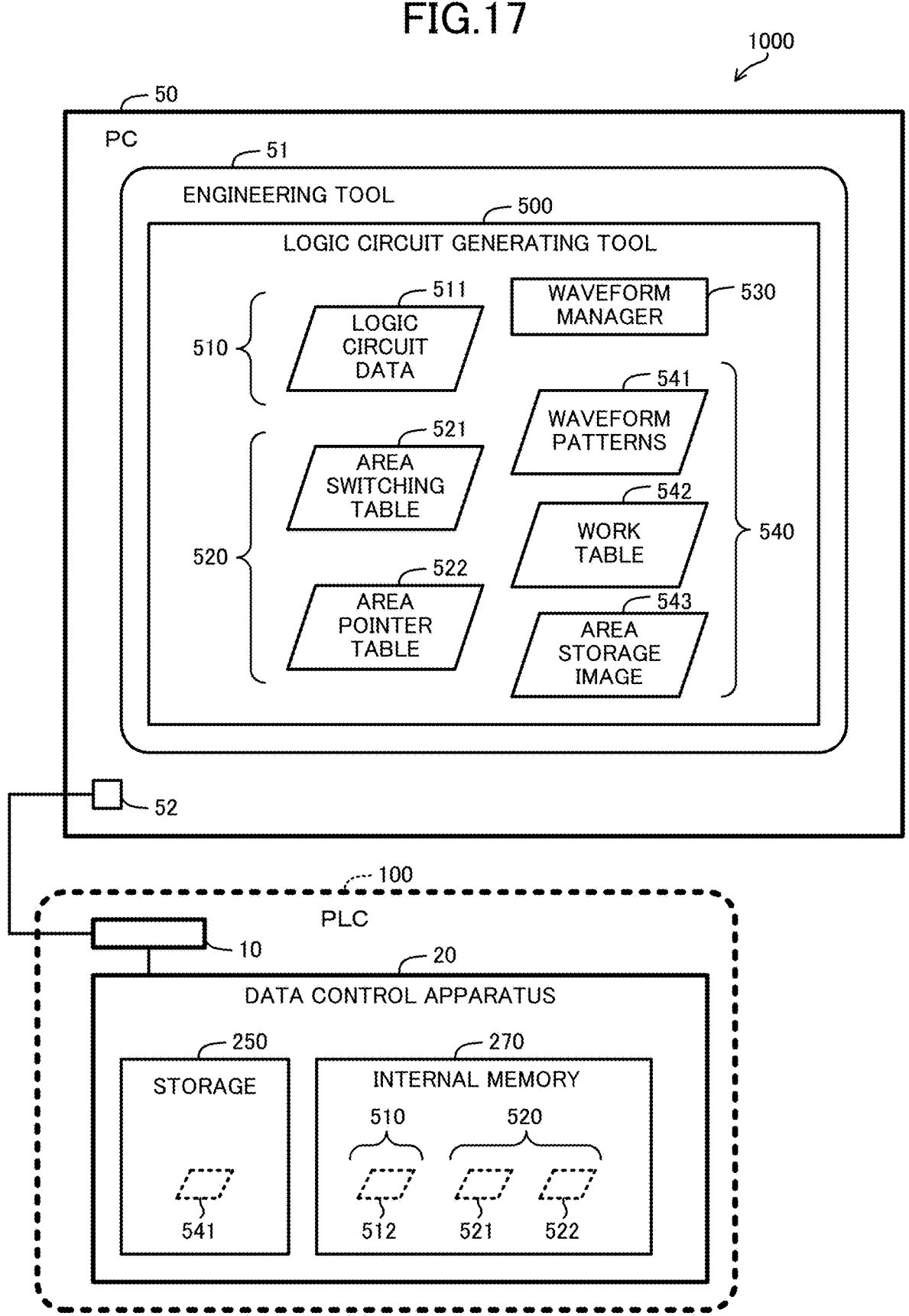
FIG. 17 illustrates data generated by a PC according to Embodiment 5.

As illustrated in FIG. 17, the logic circuit generating tool 500 according to the embodiment generates the logic circuit data 511, and the area switching table 521 and the area pointer table 522 for switching the storage area in the storage 250 from which data is read. As illustrated in FIG. 18, the area pointer table 522 is table data that associates the area numbers, the initial addresses and the numbers of data pieces associated with the respective area numbers, and the numbers of times of repetitive output of waveform patterns stored in the storage area having the respective area numbers, with each other. The number of times of repetition "0" illustrated in FIG. 18 indicates no upper limit of the number of times of repetition, that is, indicates that the waveform outputting operation is to be repeated until receiving another instruction to stop the operation. The number of times of repetition may be excluded from the area pointer table 522.

Referring back to FIG. 17, the logic circuit generating tool 500 has a function of a waveform manager 530 for providing the setting for outputting an analog signal having a predetermined waveform. The waveform manager 530 generates waveform patterns 541 representing predetermined multiple waveforms, a work table 542 that associates the waveform patterns 541 with the area pointer table 522, and an area storage image 543 used for storage of the waveform patterns 541 into the storage 250. The waveform patterns 541, the work table 542, and the area storage image 543 constitute waveform information 540 on the waveforms that are set by the user to be output.

Figure 19:
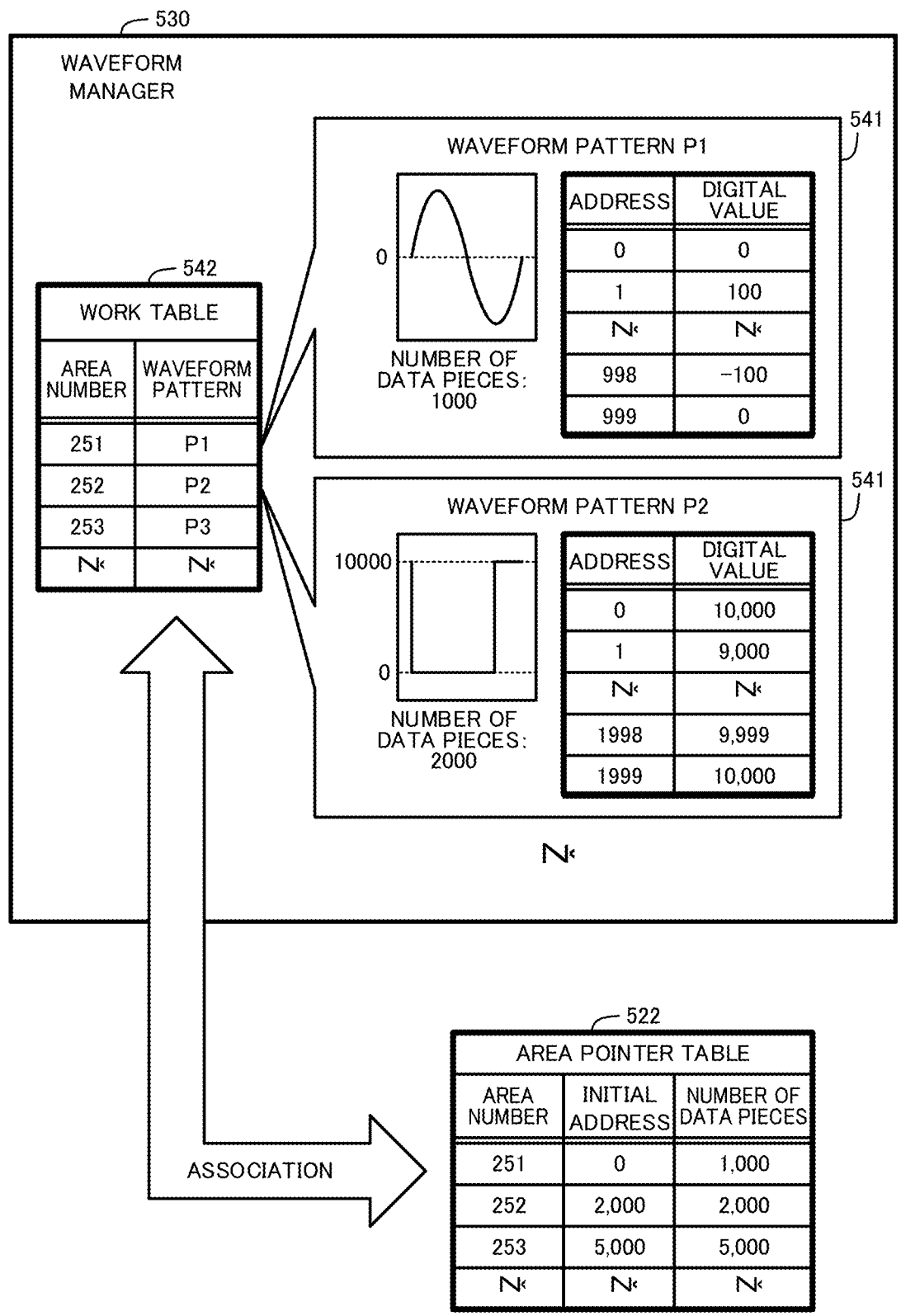
FIG. 19 is a first schematic diagram illustrating functions of a waveform manager according to Embodiment 5.
Figure 20:
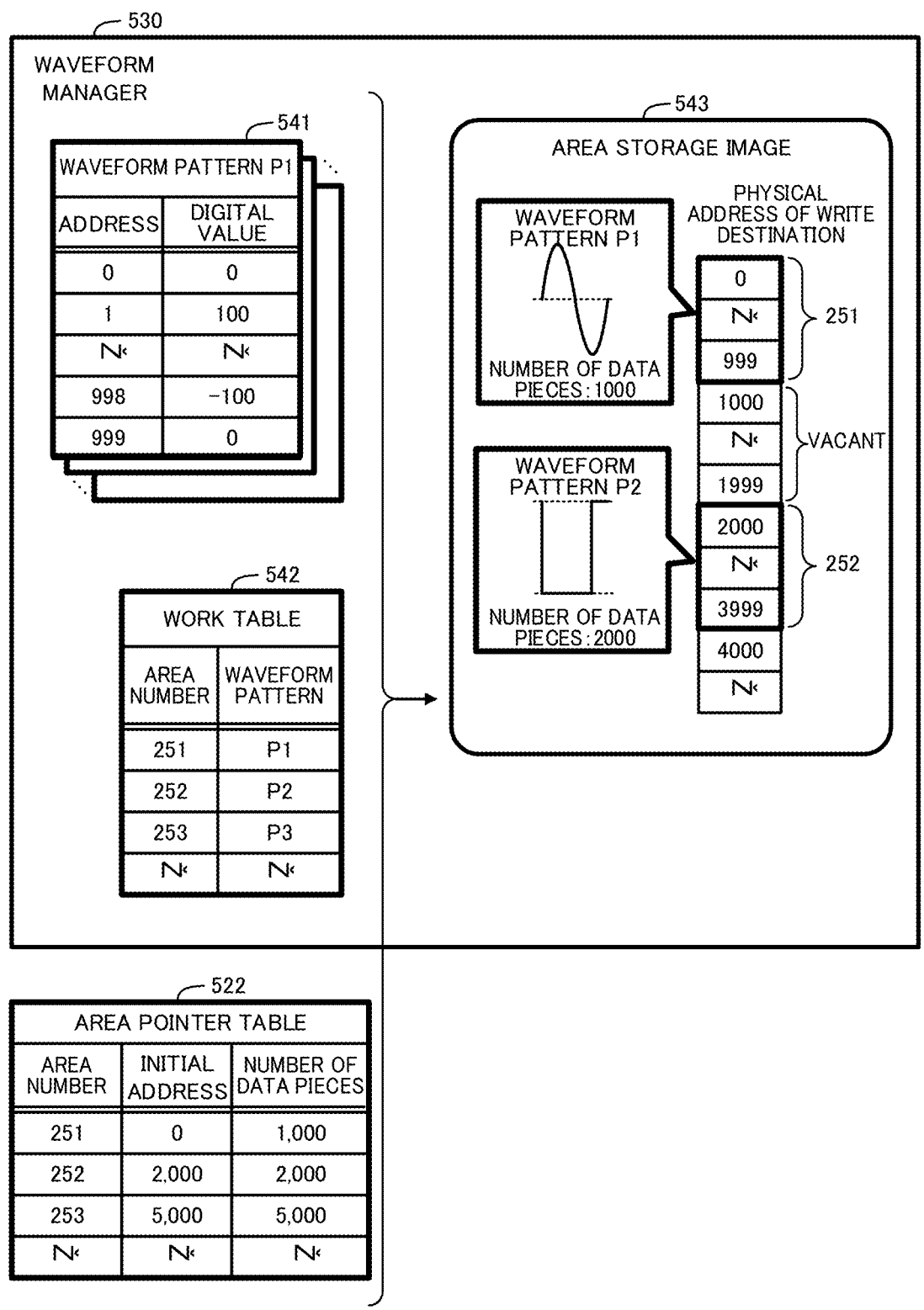
FIG. 20 is a second schematic diagram illustrating functions of a waveform manager according to Embodiment 5.

FIGS. 19 and 20 are schematic diagrams illustrating functions of the waveform manager 530. As illustrated in FIG. 19, the waveform manager 530 generates multiple waveform patterns 541. In order to cause the DA conversion block 214 to continuously output analog signals, an array of data is sequentially input to the DA conversion block 214. Each of the waveform patterns 541 corresponds to a part constituting this data array. The waveform pattern 541 contains relative addresses starting from 0 and digital values corresponding to sampled values of the waveform. The user may define the waveform pattern 541 by using table data that associates the addresses with the digital values or by rendering a waveform using a graphic tool. The waveform pattern 541 may be defined in the form of time function or specified by adjusting predetermined parameters. P1 and P2 in FIG. 19 represent identifiers of the waveform patterns 541.

The waveform manager 530 also associates the respective waveform patterns 541 with the area pointer table 522 by means of the work table 542. The work table 542 is table data that associates the area numbers with the identifiers of the waveform patterns 541. The user sets the work table 542 by selecting a corresponding waveform pattern for each of the area numbers in the area pointer table 522. In response to the setting of the work table 542, a storage area for accommodating the number of data pieces associated with the area number in the area pointer table 522 is secured in the storage 250.

The waveform manager 530 then generates the area storage image 543 from the waveform patterns 541, the work table 542, and the area pointer table 522, as illustrated in FIG. 20. For example, the digital values constituting the waveform pattern P1 associated with the area number "251" are sequentially stored in the physical addresses from "0" to "999" of the storage 250. Also, the digital values constituting the waveform pattern P2 associated with the area number "252" are sequentially stored in the physical addresses from "2000" to "3999" of the storage 250. In accordance with the resulting area storage image 543, the waveform manager 530 causes all the waveform patterns 541 to be loaded in the storage 250.

Figure 21:
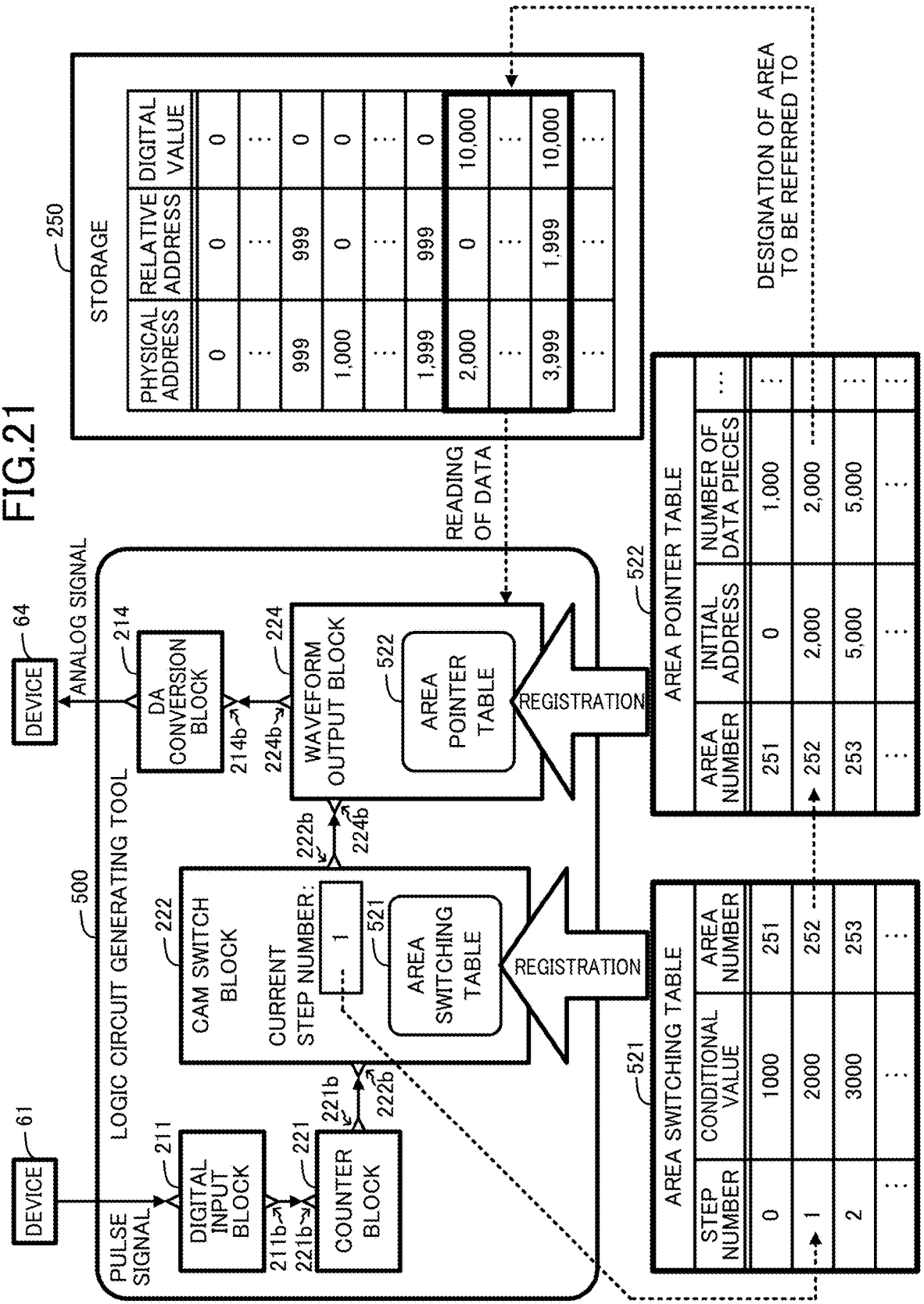
FIG. 21 illustrates an example of drawn logic circuit diagram according to Embodiment 5.

FIG. 21 illustrates an example of a drawn logic circuit diagram set by the user using the logic circuit generating tool 500. In the example illustrated in FIG. 21, the cam switch block 222 outputs the area number corresponding to the number of pulses counted by the counter block 221 through one of the terminals 222*b* to one of the terminals 224*b* of the waveform output block 224. The waveform output block 224 functions as output means for switching the storage area from which digital values are read on the basis of the comparison in the cam switch block 222, and reading and outputting the digital values.

The user registers the area switching table 521 in the cam switch block 222 and registers the area pointer table 522 in the waveform output block 224. The cam switch block 222 outputs the area number based on the comparison of the count value obtained from the counter block 221 with the conditional values in the area switching table 521, to the waveform output block 224. The waveform output block 224 reads the area pointer table 522 from the internal memory 270, sequentially reads digital values from the storage area associated with the area number output from the cam switch block 222, and outputs the read digital values to the DA conversion block 214. For example, while the area number "252" is being output from the cam switch block 222, the waveform output block 224 refers to the storage area that stores 2,000 data pieces from the address "2000" and sequentially reads digital values from this storage area, as represented by the dashed arrows.

When the area number output from the cam switch block 222 is changed, the waveform output block 224 switches the storage area from which digital values are read to another storage area associated with a new area number. This switching operation is repetitively executed in an output period set by the execution parameters registered in the register 224a. This output period may be synchronized with the internal control clock of the data controller 210, or may have a length several to several tens of times longer than the length of the internal control clock, for example, provided that the output period is significantly shorter than the scan time of the CPU 10.

The DA conversion block 214 acquires the digital values continuously output from the waveform output block 224 and outputs analog signals at the levels corresponding to the acquired digital values. That is, the DA conversion block 214 varies the level of an analog signal to be output in accordance with the transition of the digital value. The DA conversion block 214 functions as DA conversion means for converting digital signals indicating digital values into analog signals. The analog signals after conversion have a granularity defined by the output period of the digital values. The DA conversion block 214 can output smoother analog signals because the waveform output block 224 sequentially reads and outputs digital values more rapidly than the scan time of the CPU 10. The analog signals output from the DA conversion block 214 are transmitted by the analog signal output interface 244 to the device 64.

The reading process executed by the data control apparatus 20 in which the operations illustrated in FIG. 21 are set is explained. The reading process is achieved by execution of processes by the individual general circuit blocks in synchronization with the internal control clock, as illustrated in FIG. 21. The digital input block 211, the counter block 221, and the cam switch block 222 function in the same manner as in Embodiment 1. The DA conversion block 214 executes DA conversion of the digital signals containing the digital values output from the waveform output block 224 in synchronization with the internal control clock, and outputs the analog signals after conversion to the device 64.

Figure 22:
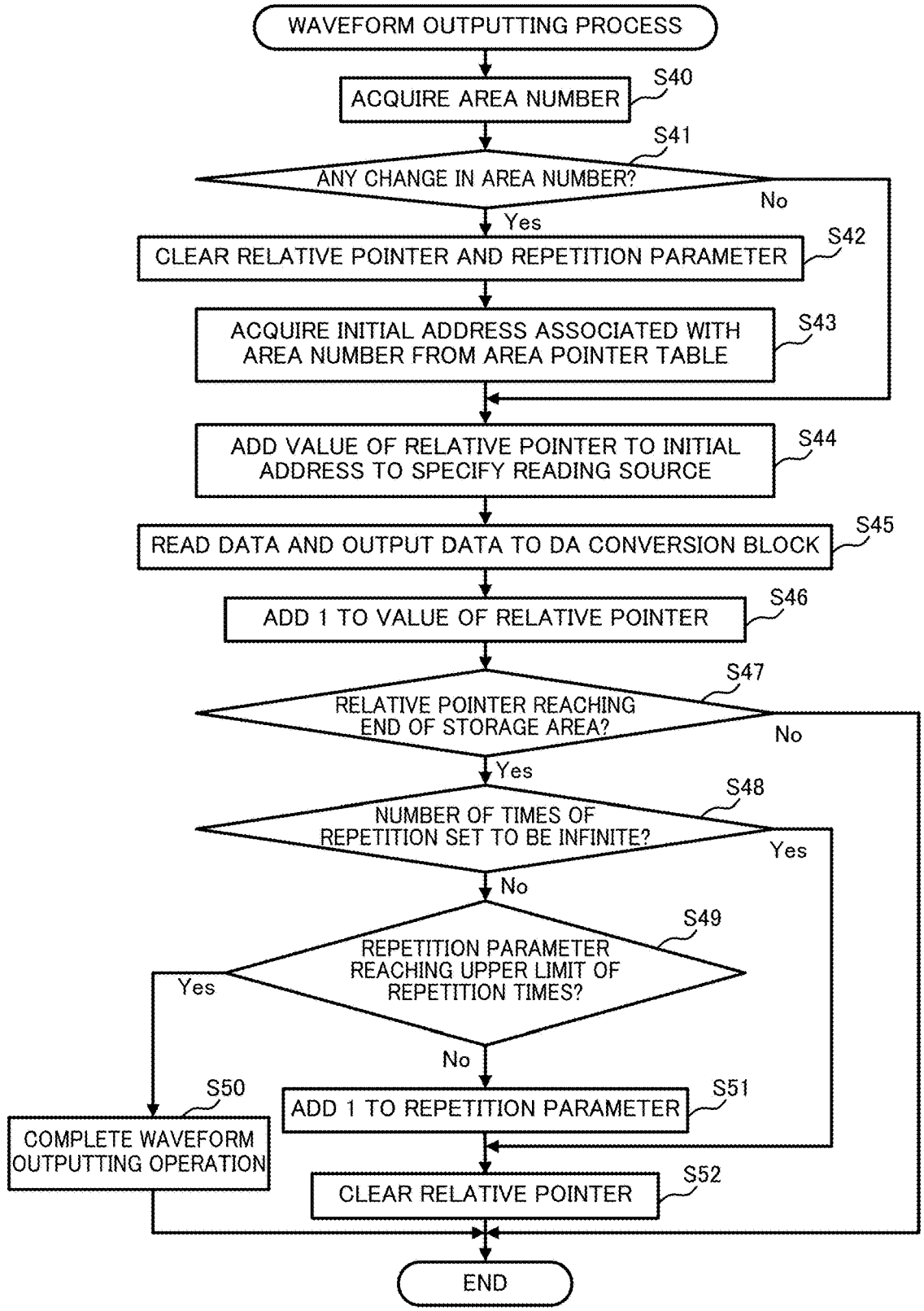
FIG. 22 is a flowchart illustrating a waveform outputting process according to Embodiment 5.

The waveform outputting process in the waveform output block 224 is explained with reference to FIG. 22. In the waveform outputting process, the waveform output block 224 acquires an area number (Step S40). Specifically, the waveform output block 224 obtains the area number that was output from the cam switch block 222 and has arrived at the terminal 224b.

The waveform output block 224 then determines whether any change has occurred in the area number output from the cam switch block 222 (Step S41). Specifically, the waveform output block 224 determines whether the area number acquired in Step S40 differs from the area number that was used in the previous data reading process in the waveform output block 224. When determining no change in the area number (Step S41; No), the waveform output block 224 proceeds to Step S44.

In contrast, when determining any change in the area number (Step S41; Yes), the waveform output block 224 clears the relative pointer and the repetition parameter (Step S42). The repetition parameter indicates the number of times of repetitive output of waveforms. When a positive determination is made in Step S41, the waveform output block 224 starts reading a waveform pattern from a new storage area, and thus sets the relative pointer and the repetition parameter to 0.

The waveform output block 224 then acquires the initial address associated with the area number, which is determined to have a change in Step S41, from the area pointer table 522 (Step S43).

The waveform output block 224 then adds the value of the relative pointer to the initial address and thereby specifies the position for reading digital values (Step S44). Specifically, the waveform output block 224 adds the value of the relative pointer to the initial address of the storage area, which is the current reading source, and thereby specifies the physical address of the reading source of digital values.

The waveform output block 224 then reads data from the address specified in Step S44 and outputs the read data to the DA conversion block 214 (Step S45). Specifically, the waveform output block 224 reads the digital value stored in the address determined by adding the value of the relative pointer to the initial address, and then outputs the read digital value.

The waveform output block 224 then adds 1 to the value of the relative pointer (Step S46). The waveform output block 224 then determines whether the current relative pointer has reached the end of the storage area (Step S47). Specifically, the waveform output block 224 refers to the area pointer table 522 and determines whether the value of the relative pointer is equal to the value calculated by subtracting 1 from the number of data pieces in the storage area, which is the current reading source.

If determining that the relative pointer has not reached the end (Step S47; No), the waveform output block 224 terminates the waveform outputting process. In contrast, if determining that the relative pointer has reached the end (Step S47; Yes), the waveform output block 224 refers to the area pointer table 522 and determines whether the number of times of repetition is set to be infinite (Step S48). Specifically, the waveform output block 224 determines whether the number of times of repetition, which is associated with the storage area including the address from which data is read in Step S45 in the area pointer table 522, is "0" or not.

If determining that the number of times of repetition is set to be infinite (Step S48; Yes), the waveform output block 224 clears the relative pointer (Step S52). Accordingly, if the completion of sequential reading of digital values until the end of the storage area is followed by re-execution of the waveform outputting process without switching the storage area, digital values are sequentially read from the initial address of the same storage area again, resulting in repetition of output of the waveform pattern from this storage area. The waveform outputting process is then terminated.

In contrast, if determining that the number of times of repetition is set to be finite (Step S48; No), the waveform output block 224 determines whether the repetition parameter has reached the upper limit of repetition times (Step S49). Specifically, the waveform output block 224 refers to the area pointer table 522 and determines whether the set number of times of repetition is equal to the value of the current repetition parameter.

If determining that the repetition parameter has reached the upper limit (Step S49; Yes), the waveform output block 224 determines completion of the waveform outputting operation (Step S50), and terminates reading of the waveform pattern from this storage area. The waveform output block 224 may continue the reading operation from another storage area or terminate the reading operation. The waveform output block 224 may also inform the PC 50 of completion of the waveform outputting operation via the CPU 10. The waveform outputting process is then terminated.

In contrast, if determining that the repetition parameter has not reached the upper limit (Step S49; No), the waveform output block 224 adds 1 to the repetition parameter (Step S51), and proceeds to Step S52.

This waveform outputting process is repetitively executed in an output period set by the execution parameters registered in the register 224a.

As described above, the data control apparatus 20 is connected to the device 64. The data control apparatus 20 is equipped with the communication interface 260 for receiving the correlation information 520 containing the area switching table 521 and the area pointer table 522, the data controller 210 for outputting an analog signal generated from the digital value read from one of the storage areas, and the analog signal output interface 244 for transmitting the analog signal as an output signal to the device 64. The data controller 210 includes the cam switch block 222 for acquiring the reference signal indicating the counted number from the counter block 221 and comparing the value of the reference signal with the conditional values in the area switching table 521, the waveform output block 224 for switching the storage area from which the digital value is read on the basis of the comparison in the cam switch block 222 and reading and outputting the digital value, and the DA conversion block 214 for converting the digital signal indicating the digital value into an analog signal.

This configuration can achieve switching of the storage area from which digital values are read depending on the value of the reference signal. The configuration can thus improve the convenience of the process on analog signals to be transmitted to the device 64. Specifically, the data control apparatus 20 can continue the data reading operation while rapidly switching the storage area in the order of nanoseconds by means of the hardware process depending on the value of the reference signal, without being affected by the scan time of the CPU 10 or the program processing speed.

The comparison and determinations conducted by the cam switch block 222 and the waveform output block 224 in the above-explained configuration may also be conducted by the comparison operation block 225, the logical operation block 226, or the calculator 280. For example, at least one of the comparison operation block 225 and the logical operation block 226 may execute the determinations in Steps S41 and S47 to S49 in FIG. 22.

Embodiment 6

Embodiment 6 is described while focusing on the differences from Embodiment 5. The components identical or corresponding to each other are provided with the same reference symbol as that in Embodiment 5 without redundant description or with simplified description. Although the storage area is switched depending on the state of the pulse signal in Embodiment 5, the storage area may also be switched depending on the state of an analog signal. The following description is directed to an embodiment in which the storage area is switched depending on the level of an analog signal.

Figure 23:
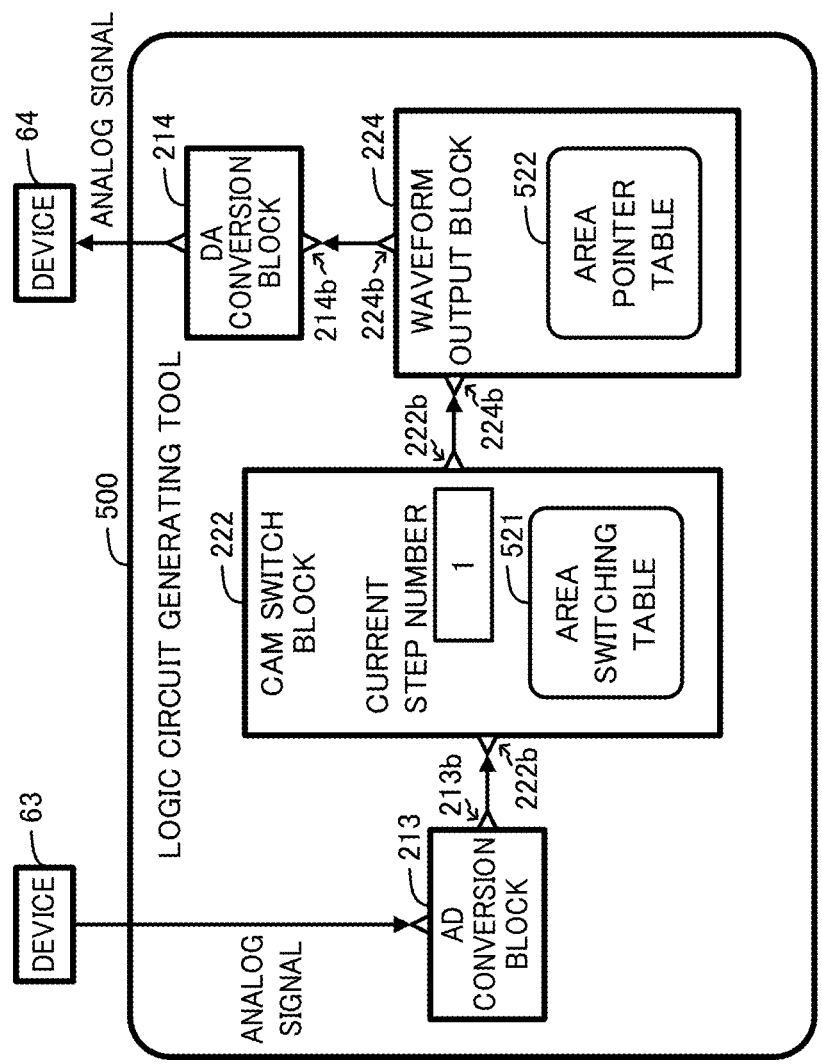
FIG. 23 illustrates an example of drawn logic circuit diagram according to Embodiment 6.

FIG. 23 illustrates an example of a drawn logic circuit diagram generated by the logic circuit generating tool 500. The data control apparatus 20 receives an analog signal from the device 63. In detail, the analog signal input interface 243 outputs the analog signal from the device 63 to the data controller 210. As illustrated in FIG. 23, the analog signal from the device 63 is input to the AD conversion block 213, and the digital signal output through one of the terminals 213b of the AD conversion block 213 is input to one of the terminals 222b of the cam switch block 222. The cam switch block 222 and the waveform output block 224 function in the same manner as in Embodiment 5.

As described above, in the embodiment in which the storage area from which a waveform pattern is read is switched depending on the analog signal from the device 63, the data control apparatus 20 also brings about the same effects as in Embodiment 5. Specifically, the AD conversion block 213 converts this analog signal into a digital signal, which is the reference signal, and thereby generates the reference signal. The data control apparatus 20 can thus rapidly switch the storage area depending on the state of the reference signal. This embodiment is configured by applying the same modification to Embodiment 5 as the modification applied to Embodiment 1 to configure Embodiment 2.

Embodiment 7

Embodiment 7 is described while focusing on the differences from Embodiment 5. The components identical or corresponding to each other are provided with the same reference symbol as that in Embodiment 5 without redundant description or with simplified description. Although the storage area is switched depending on the input signal from the external device in Embodiments 5 and 6, the reference signal for switching the storage area may be generated inside the data control apparatus 20. The following description is directed to an embodiment in which the data control apparatus 20 switches the storage area at timings generated in the internal clock.

Figure 24:
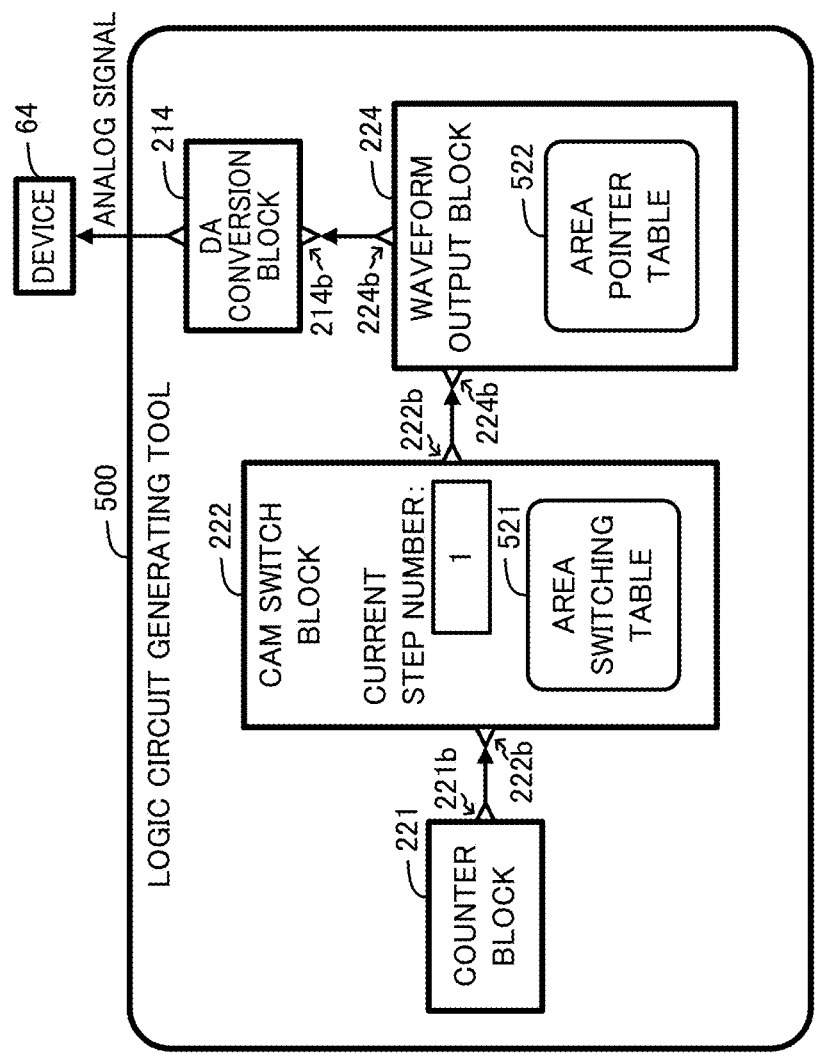
FIG. 24 illustrates an example of drawn logic circuit diagram according to Embodiment 7.

As illustrated in FIG. 13, the data controller 210 is equipped with the clock block 229 as a general circuit block. FIG. 24 illustrates an example of a drawn logic circuit diagram generated by the logic circuit generating tool 500. The counter block 221 illustrated in FIG. 24 is provided with a function of ring counter operating in the period desired by the user. The counter block 221 counts the clock signals from the clock block 229. When the count value reaches a value of the predetermined period, the counter block 221 executes a counting-up or counting-down operation of the ring counter, and outputs the count value through the terminal 221b. The output count value is input to the cam switch block 222 through one of the terminals 222b. The cam switch block 222 and the waveform output block 224 function in the same manner as in Embodiment 5.

As described above, the data control apparatus 20 is disconnected from the input from an external device. The data control apparatus 20 generates timings in the period of nanoseconds desired by the user, and the user sets the conditional values in the area switching table 521. The data control apparatus 20 can thus achieve flexible switching of the storage area with high accuracy. This embodiment is configured by applying the same modification to Embodiment 5 as the modification applied to Embodiment 1 to configure Embodiment 3.

Embodiment 8

Embodiment 8 is described while focusing on the differences from Embodiment 5. The components identical or corresponding to each other are provided with the same reference symbol as that in Embodiment 5 without redundant description or with simplified description. Although the storage area is switched depending on the value of the reference signal in Embodiments 5 to 7, the user may directly designate the storage area.

Figure 25:
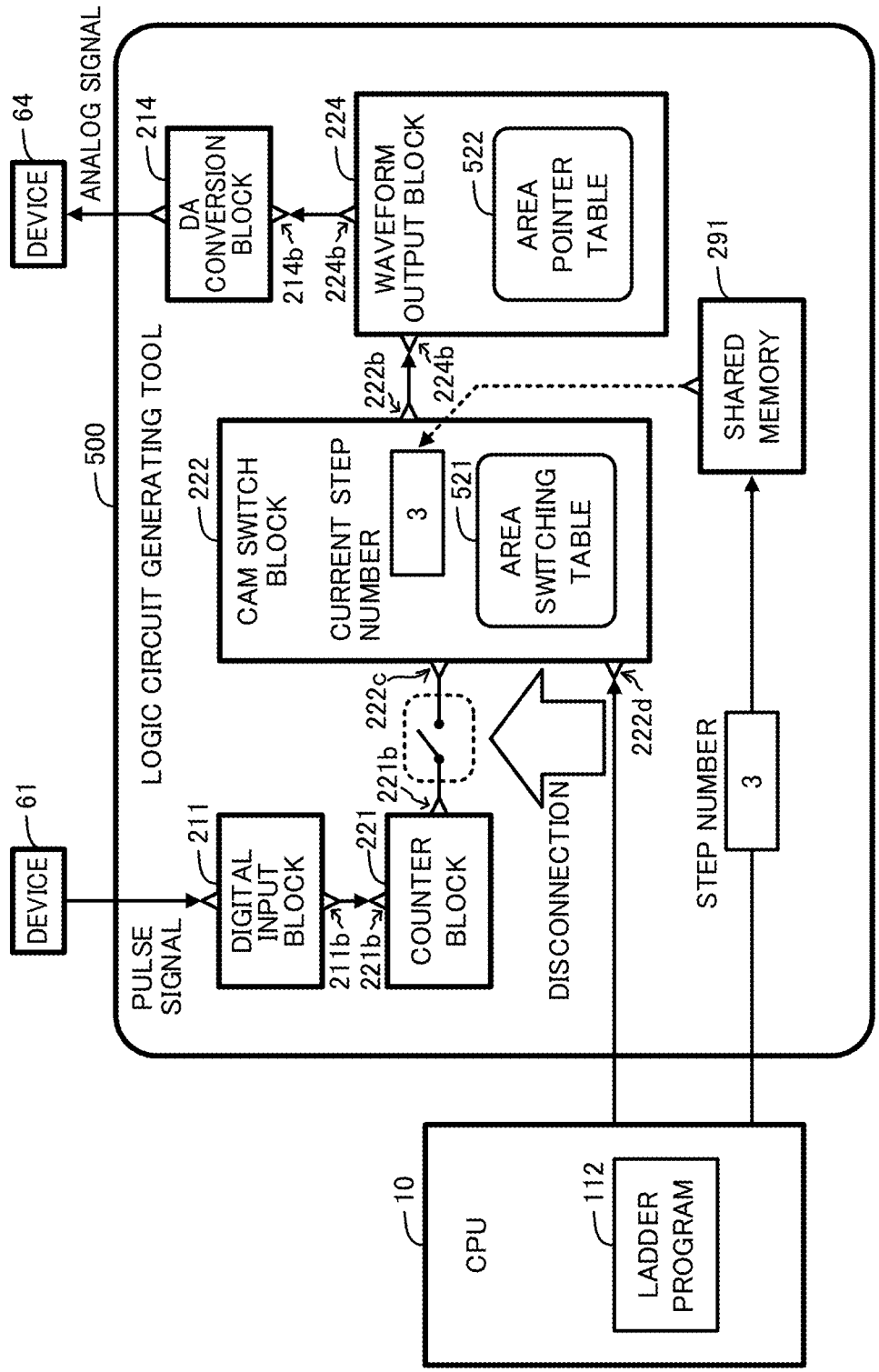
FIG. 25 illustrates an example of drawn logic circuit diagram according to Embodiment 8.

As illustrated in FIG. 15, the data control apparatus 20 is equipped with the shared memory 291. FIG. 25 illustrates an example of a drawn logic circuit diagram generated by the logic circuit generating tool 500. As illustrated in FIG. 25, if receiving an external operation switching signal from the CPU 10, the cam switch block 222 stops acquiring the count value input through the terminal 222c and skips the process of checking the count value against the area switching table 521. The cam switch block 222 then links the active step number to a specific address of the shared memory 291. The CPU 10 stores an instruction value from the user in the above-mentioned address of the shared memory 291. If the value in the above-mentioned address of the shared memory 291 is updated during input of the external operation switching signal to the cam switch block 222, the updated value is immediately reflected in the cam switch block 222. The cam switch block 222 then outputs the area number, which is associated in the area switching table 521 with the step number written in the shared memory 291.

As described above, the user can designate the storage area at a desired timing by directly adjusting the active step number in the cam switch block 222. This embodiment is configured by applying the same modification to Embodiment 5 as the modification applied to Embodiment 1 to configure Embodiment 4.

The instruction value from the user may also be an area number instead of the step number. Alternatively, the shared memory 291 may be referred to by the waveform output block 224 without being referred to by the cam switch block 222. In the case where the waveform output block 224 refers to the shared memory 291, in response to reception of an external operation switching signal, the waveform output block 224 stops acquiring a signal from the cam switch block 222 and acquires the area number or address from the shared memory 291. The waveform output block 224 then sequentially reads digital values from the initial address associated with the acquired area number in the area pointer table 522 or from the acquired address.

The above-described embodiments of the disclosure should not be construed as limiting the disclosure.

For example, although the devices 61 to 65 are separate devices in the above-described embodiments, these devices 60 may constitute a single apparatus.

Figure 26:
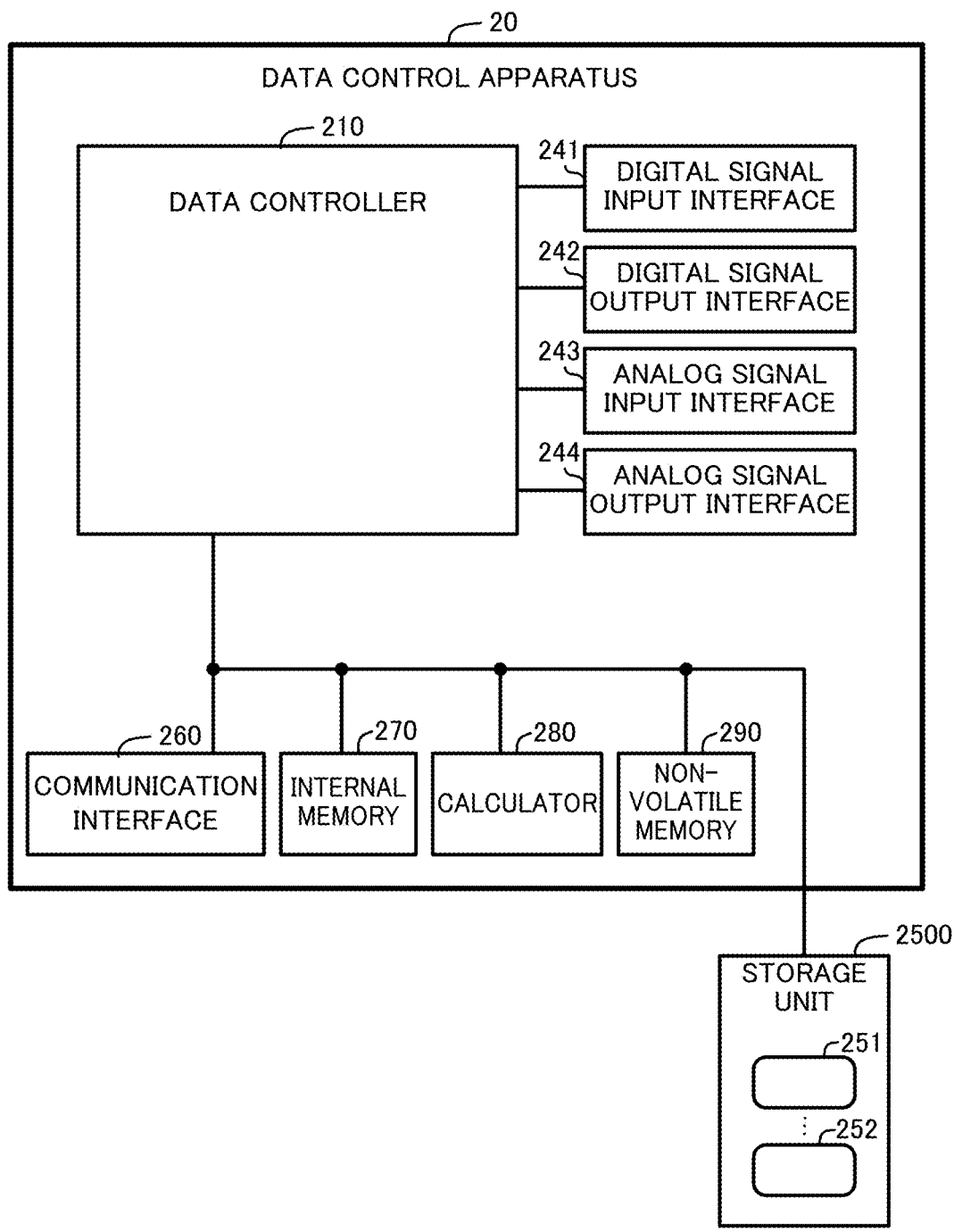
FIG. 26 illustrates a configuration of a data control apparatus according to a modification.

Although the storage 250 is installed in the data control apparatus 20 in the above-described embodiments, this configuration is a mere example. As illustrated in FIG. 26, the data control apparatus 20 may be connected to a storage unit 2500 serving as an external unit of the data control apparatus 20. In this case, the data control apparatus 20 may write or read data into or from the storage areas 251 and 252 included in the storage unit 2500. The data control apparatus 20 may switch the storage area depending on the situation. Alternatively, the storage areas 251 and 252 should not necessarily be included in the single storage 250 or storage unit 2500. for example, the data control apparatus 20 may include the storage 250 and be connected to the storage unit 2500, and switch the storage area between the storage area 251 in the storage 250 and the storage area 252 in the storage unit 2500 depending on the situation.

The area switching table 521 and the area pointer table 522 stored in the internal memory 270 in the above-described embodiments may also be stored in the storage 250.

Although the area switching table 521 and the area pointer table 522 constitute the correlation information 520 in the above-described embodiments, this configuration is a mere example. For example, the area switching table 521 and the area pointer table 522 in Embodiment 1 may be combined into a single table as illustrated in FIG. 27, and the combined table may be registered in both of the cam switch block 222 and the logger block 223. Also, the area switching table 521 and the area pointer table 522 in Embodiment 5 may be combined into a single table, and the combined table may be registered in both of the cam switch block 222 and the waveform output block 224.

In the case where the data control apparatus 20 simultaneously executes switching of the storage area into which the logger block 223 writes data and switching of the storage area from which the waveform output block 224 reads data, the correlation information 520 may further associate the data types with the area numbers, as illustrated in FIG. 28. The data type is used to discriminate the storage areas to be subject to the logging operation in the logger block 223 from the storage areas to be subject to the reading operation in the waveform output block 224.

The cam switch block 222 outputs the area number associated with the minimum conditional value larger than the value of the reference signal among the conditional values in the area switching table 521, and the logger block 223 switches the storage area to be accessed to the storage area associated with this area number in the area pointer table 522 in the above-described embodiments. This configuration is, however, a mere example. For example, the cam switch block 222 may output the area number associated with the maximum conditional value smaller than the value of the reference signal among the conditional values in the area switching table 521, and the logger block 223 may switch the storage area to the storage area associated with this area number.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The disclosure is suitable for rapid wiring or rapid reading of data.

REFERENCE SIGNS LIST

1000 PLC system
100 PLC

10 CPU
11 Memory
111 Parameter
112 Ladder program
12 Calculator
13 PC interface
14 Communication interface
20 Data control apparatus
210 Data controller
211 Digital input block
212 Digital output block
213 AD conversion block
214 DA conversion block
221 Counter block
222 Cam switch block
223 Logger block
224 Waveform output block
225 Comparison operation block
226 Logical operation block
227 Arithmetic operation block
228 Filter block
229 Clock block
211a, 212a, 213a, 214a, 221a, 222a, 223a, 224a, 225a, 226a, 227a, 228a, 229a Register
211b, 212b, 213b, 214b, 221b, 222b, 222c, 222d, 223b, 224b, 225b, 226b, 227b, 228b, 229b Terminal
230 Circuit block switching bus
241 Digital signal input interface
242 Digital signal output interface
243 Analog signal input interface
244 Analog signal output interface
250 Storage
251, 251a, 252, 252a Storage area
260 Communication interface
270 Internal memory
280 Calculator
290 Non-volatile memory
291 Shared memory
30 Communication bus
50 PC
51 Engineering tool
52 Communication interface
500 Logic circuit generating tool
510 Setting information
511 Logic circuit data
512 Operation parameter
520 Correlation information
521 Area switching table
522 Area pointer table
530 Waveform manager
540 Waveform information
541 Waveform pattern
542 Work table
543 Area storage image
60-65 Device
61a Encoder
63a Laser displacement sensor
71 Wafer
2500 Storage unit

The invention claimed is:

1. An input-output control unit constituting a programmable logic controller together with a central processing unit and for connection to a first device and a second device that are disposed on a line of a factory, the input-output control unit comprising:
a first input interface to receive a device signal from the first device;
a communication interface to receive correlation information indicating addresses of storage areas included in a storage and conditional values associated with the storage areas; and
a data controller to write a digital value generated from the device signal into one of the storage areas, wherein the data controller comprises:
a comparer to acquire a reference signal generated from an input signal input from the second device, and to compare a value of the reference signal with at least one of the conditional values; and
a logger to switch the storage area into which the digital value is written, based on the comparison in the comparer, and to write the digital value into the storage area.

2. The input-output control unit according to claim 1, wherein the logger switches the storage area into which the digital value is written, to a storage area having an address associated with a minimum conditional value among the conditional values that is larger than the value of the reference signal or a maximum conditional value among the conditional values that is smaller than the value of the reference signal.

3. The input-output control unit according to claim 1, further comprising:
a second input interface to receive the input signal, wherein
the input signal is a pulse signal, and
the data controller further comprises a counter to count a number of pulses contained in the pulse signal and to output the reference signal indicating the counted number.

4. The input-output control unit according to claim 1, wherein
the device signal and the input signal are analog signals, the reference signal is a digital signal,
the first input interface receives the input signal, and
the data controller further comprises an AD converter to convert a level of the device signal into the digital value and to convert the input signal into the reference signal.

5. The input-output control unit according to claim 1, wherein
the communication interface receives an instruction value designated by a user, and
when the communication interface receives the instruction value, the logger switches the storage area into which the digital value is written, to a storage area indicated by the instruction value.

6. An input-output control unit constituting a programmable logic controller together with a central processing unit and for connection to a first device and a second device that are disposed on a line of a factory, the input-output control unit comprising:
a communication interface to receive correlation information indicating addresses of storage areas included in a storage and conditional values associated with the storage areas;
a data controller to read a digital value from one of the storage areas and to output an output signal generated from the digital value; and
an output interface to transmit the output signal to the first device, wherein
the data controller comprises:
a comparer to acquire a reference signal generated from an input signal input from the second device, and to compare a value of the reference signal with at least one of the conditional values; and an outputter to switch the storage area from which the digital value is read, based on the comparison in the comparer, to read the digital value from the storage area, and to output the digital value.

7. A programmable logic controller comprising:
the input-output control unit according to claim 1; and
the central processing unit to provide an instruction on operations to the input-output control unit.

8. A data control method performed by an input-output control unit constituting a programmable logic controller together with a central processing unit and for connection to a first device and a second device that are disposed on a line of a factory, the data control method comprising:
writing a digital value into one of storage areas, the digital value being generated from a device signal output from the first device;
receiving correlation information indicating addresses of the storage areas and conditional values associated with the storage areas;
comparing a value of a reference signal with at least one of the conditional values, the reference signal being generated from a signal output from the second device; and
switching the storage area into which the digital value is written, based on the comparison.

9. A data control method performed by an input-output control unit constituting a programmable logic controller together with a central processing unit and for connection to a device that is disposed on a line of a factory, the data control method comprising:
reading a digital value from one of storage areas and outputting the digital value;
receiving correlation information indicating addresses of the storage areas and conditional values associated with the storage areas;
comparing a value of a reference signal with at least one of the conditional values, the reference signal being generated from a signal output from the device;
switching the storage area from which the digital value is read, based on the comparison; and
outputting an output signal generated from the digital value.

10. The input-output control unit according to claim 1, wherein the second device is an encoder or sensor disposed in a production line.

* * * * *